US009009778B2

(12) United States Patent  (10) Patent No.: US 9,009,778 B2
Pearce et al.  (45) Date of Patent: Apr. 14, 2015

(54) SEGMENTED NETWORK IDENTITY MANAGEMENT

(75) Inventors: Andrew K. Pearce, San Francisco, CA (US); Roy L. Chua, Cupertino, CA (US)

(73) Assignee: RPX Clearinghouse LLC, San Francisco, CA (US)

( * ) Notice: Subject to any disclaimer, the term of this patent is extended or adjusted under 35 U.S.C. 154(b) by 1764 days.

(21) Appl. No.: 11/996,735

(22) PCT Filed: Jul. 28, 2006

(86) PCT No.: PCT/US2006/029605
§ 371 (c)(1),
(2), (4) Date: Jun. 23, 2008

(87) PCT Pub. No.: WO2007/016436
PCT Pub. Date: Feb. 8, 2007

(65) Prior Publication Data
US 2009/0077618 A1  Mar. 19, 2009

Related U.S. Application Data

(60) Provisional application No. 60/703,685, filed on Jul. 29, 2005.

(51) Int. Cl.
*H04L 29/06* (2006.01)

(52) U.S. Cl.
CPC ............ *H04L 63/20* (2013.01); *H04L 63/0892* (2013.01); *H04L 63/105* (2013.01); *H04L 63/08* (2013.01)

(58) Field of Classification Search
USPC ....................................................... 726/1, 4
See application file for complete search history.

(56) References Cited

U.S. PATENT DOCUMENTS

| 5,721,779 | A | 2/1998 | Funk |
| 7,124,197 | B2 | 10/2006 | Ocepek et al. |
| 7,447,166 | B1 * | 11/2008 | Kaluve et al. ................. 370/254 |
| 2003/0163737 | A1 | 8/2003 | Roskind |

(Continued)

FOREIGN PATENT DOCUMENTS

| WO | WO 2004/051964 A2 | 6/2004 |
| WO | WO 2005/103940 A2 | 11/2005 |

(Continued)

OTHER PUBLICATIONS

Steel-Belted Radius, Administration Guide, Enterprise Edition, Release 4.7, Feb. 2004, Funk Software, Inc., Cambridge, MA.*

(Continued)

*Primary Examiner* — Vikkram Bali
*Assistant Examiner* — Tracy Mangialaschi
(74) *Attorney, Agent, or Firm* — Withrow & Terranova, PLLC

(57) ABSTRACT

A service category associates a set of authenticators and a set of authentication and authorization policies. When an authenticator attempts to connect the network, the service category for such authenticator determined and the authentication and authorization policies applied. A feature of the present invention is that these policies are segmented into several sub-policies to support multiple services and apply different authentication and authorization policies for each type of service. These sub-policies are a tunnel policy, a credential validation policy, in inner tunnel policy and an authorization policy. Successful negotiation of each policy allows the authenticator to connect a network.

22 Claims, 16 Drawing Sheets

(56) References Cited

U.S. PATENT DOCUMENTS

| | | | |
|---|---|---|---|
| 2004/0168090 A1 | 8/2004 | Chawla et al. | |
| 2004/0210672 A1 | 10/2004 | Pulleyen et al. | |
| 2005/0010758 A1 | 1/2005 | Landrock et al. | |
| 2005/0055570 A1* | 3/2005 | Kwan et al. | 713/201 |
| 2005/0081045 A1* | 4/2005 | Nicodemus et al. | 713/182 |
| 2005/0120213 A1* | 6/2005 | Winget et al. | 713/171 |
| 2005/0125663 A1 | 6/2005 | Funk | |
| 2005/0125692 A1* | 6/2005 | Cox et al. | 713/201 |
| 2005/0228874 A1* | 10/2005 | Edgett et al. | 709/220 |
| 2006/0041578 A1 | 2/2006 | Bailey et al. | |
| 2006/0101520 A1 | 5/2006 | Schumaker et al. | |
| 2006/0136575 A1 | 6/2006 | Payne et al. | |
| 2006/0161653 A1 | 7/2006 | Webb et al. | |
| 2006/0164199 A1 | 7/2006 | Gilde et al. | |
| 2006/0168648 A1 | 7/2006 | Vank et al. | |

FOREIGN PATENT DOCUMENTS

| | | | |
|---|---|---|---|
| WO | WO 2005/106701 A2 | 11/2005 | |
| WO | WO 2006/001587 A1 | 1/2006 | |
| WO | WO 2006/045847 A1 | 5/2006 | |
| WO | WO 2006/062646 A2 | 6/2006 | |
| WO | WO 2006/078729 A2 | 7/2006 | |

OTHER PUBLICATIONS

InTechnology Steel-Belted RADIUS Enterprise Edition product description, copyright 2006, downloaded on Aug. 14, 2006 from http://www.funk.com.au/funk/display.asp?cid=76.

Lockdown Networks NAC Product Overview, copyright 2006, downloaded on Aug. 14, 2006 from http://www.lockdownnetworks.com/products/solutions.php.

A10 Networks IDentity Aware Network Solutions IDSentrie 1000 product overview, copyright 2005-2006, downloaded on Aug. 14, 2006 from http://www.a10networks.com/products/index.html.

Infoblox ID Aware DHCP Solution NAC Overview, downloaded on Aug. 14, 2006 from http://infoblox.com/solutions/auth-dhcp.cfm.

International Search Report for PCT Application Publication No. WO 2007/016436 A3, mailed on Jul. 12, 2007.

International Search Report from International Application Publication No. WO 2008/076760, mailed on Jun. 5, 2008.

Notification Concerning Transmittal of International Preliminary Report on Patentability for PCT Application Publication No. WO 2007/016436 A3, mailed on Feb. 7, 2008.

European Patent Office, Supplementary European Search Report for EP Application No. 06788905.5, Mar. 24, 2011, 8 pages.

Cisco Systems, User Guide for Cisco Secure Secure ACS for Windows Server, 2004, 760 pages, retrieved from Internet: http://www.cisco.com/application/pdf/en/us/guest/products/ps2086/c2001/ccmigration_09186a008205a55.pdf, Chapters 1-4, 6, 7, 10, 13-15.

A. Arthur Fisher, Authentication and Authorization: The Big Picture with IEEE 802.1X, Dec. 21, 2001, 13 pages, SANS Institute, retrieved from Internet: http://www.sans.org/rr/papers/6/123.pdf.

B. Adoba and P. Calhoun, Radius Support for Extensible Authentication Protocol, Sep. 2003, 47 pages, The Internet Society.

* cited by examiner

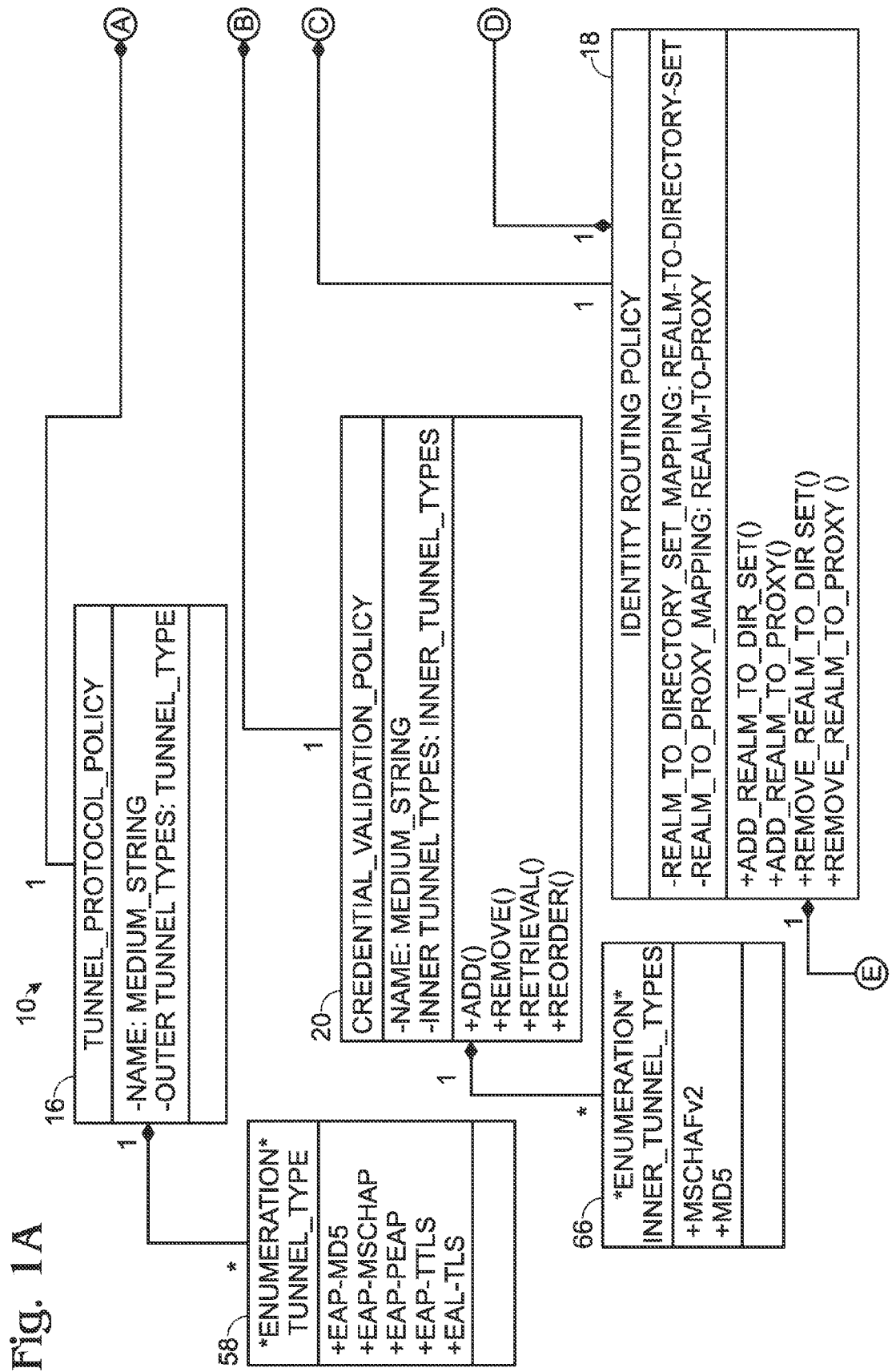

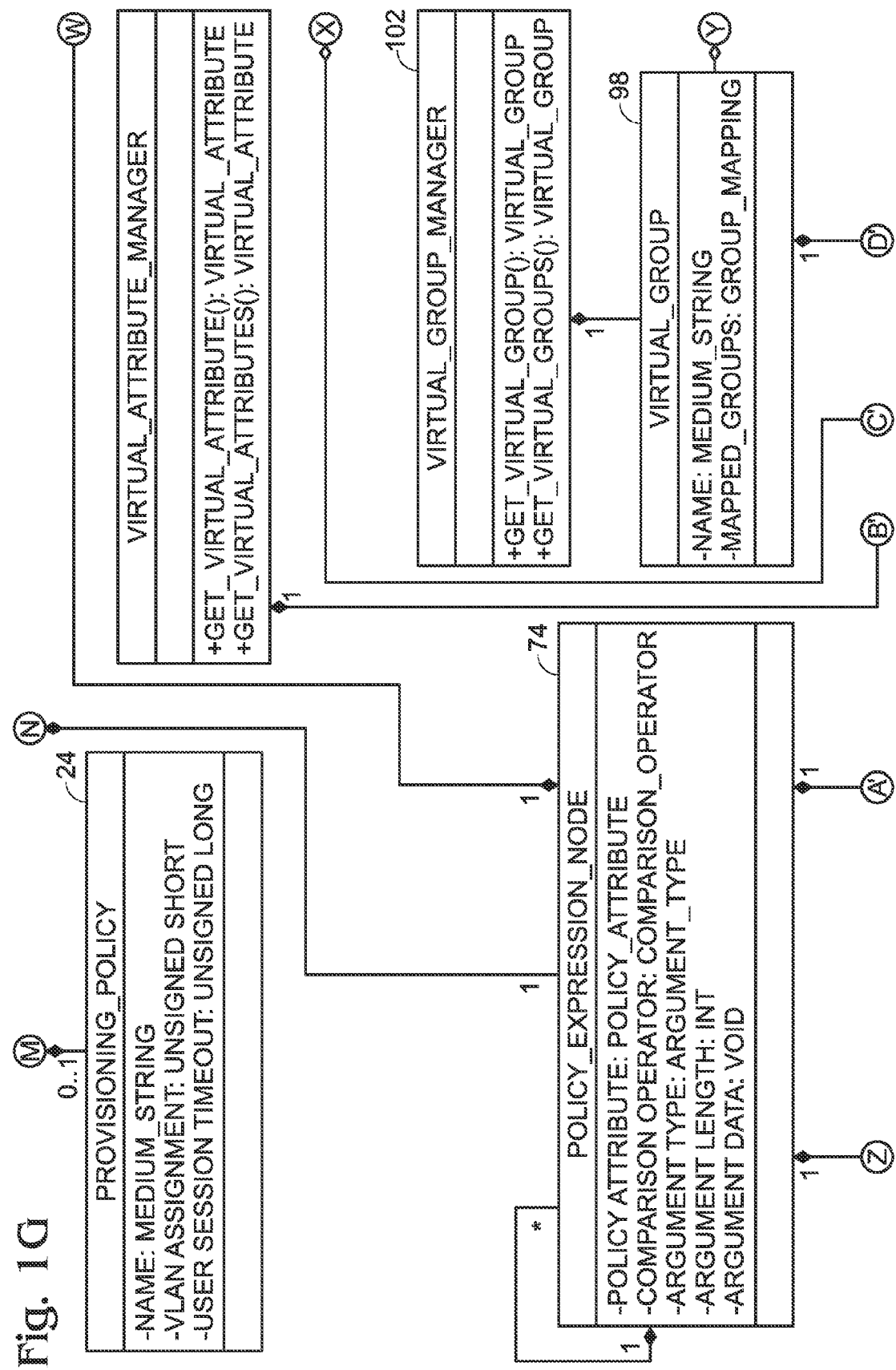

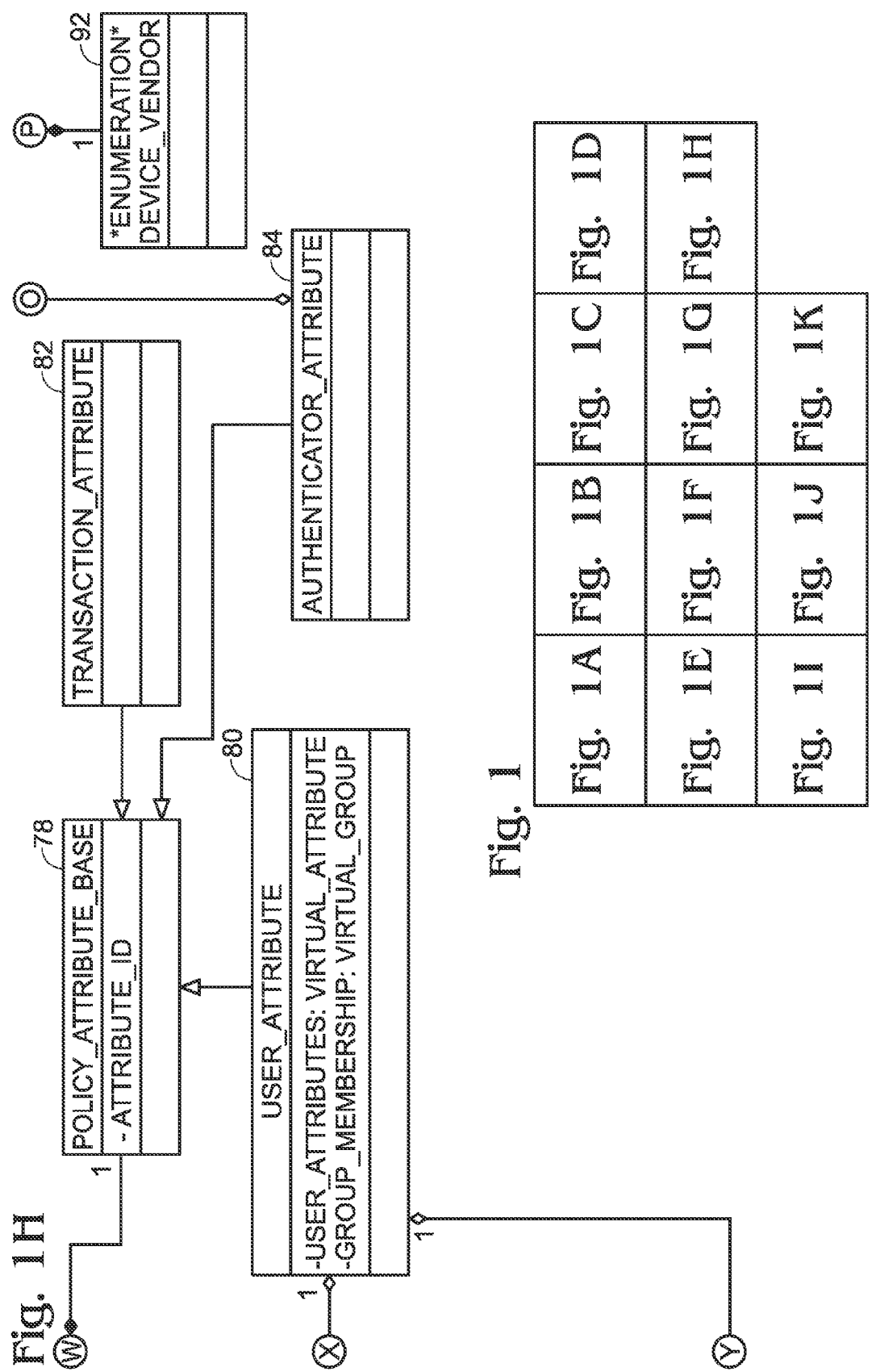

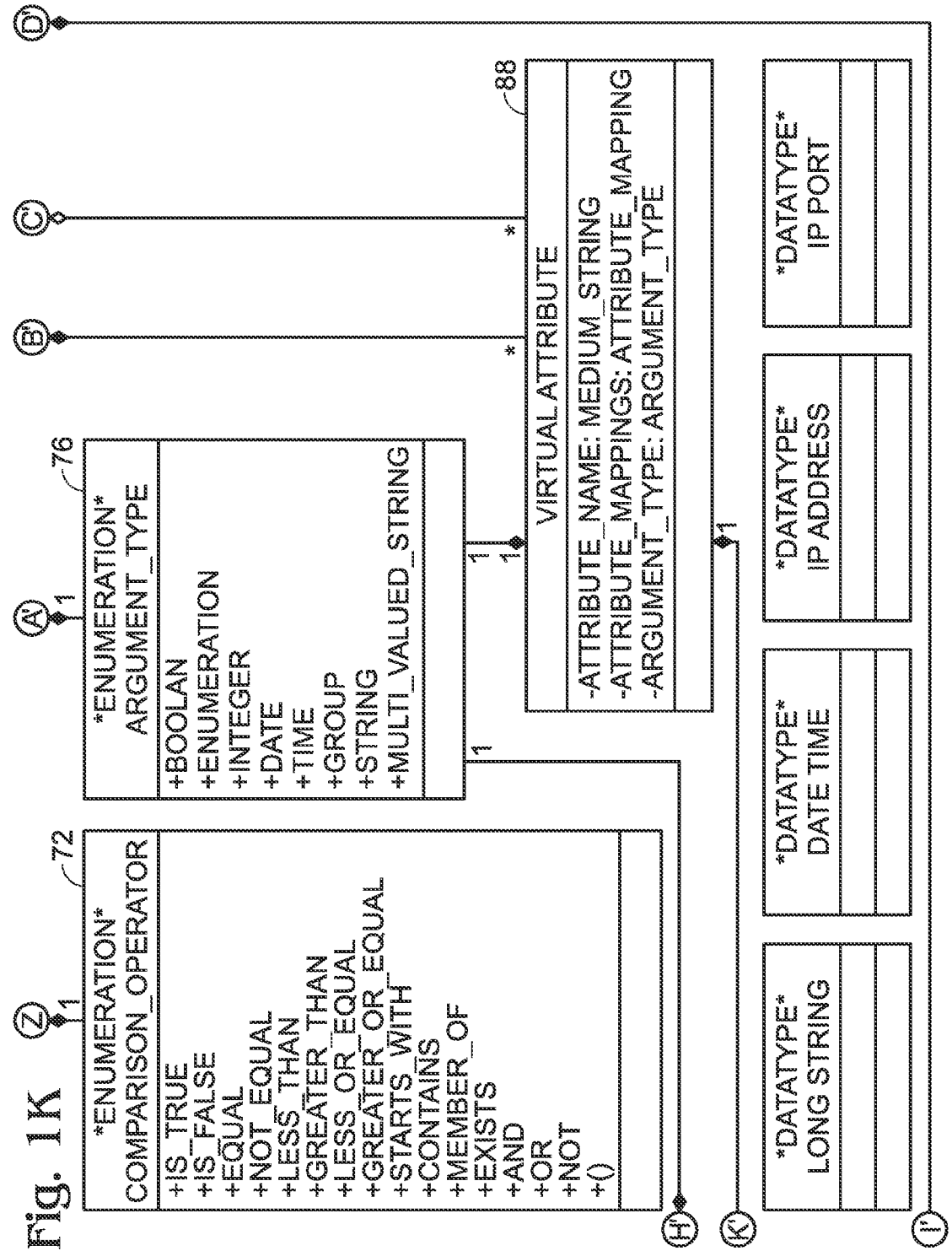

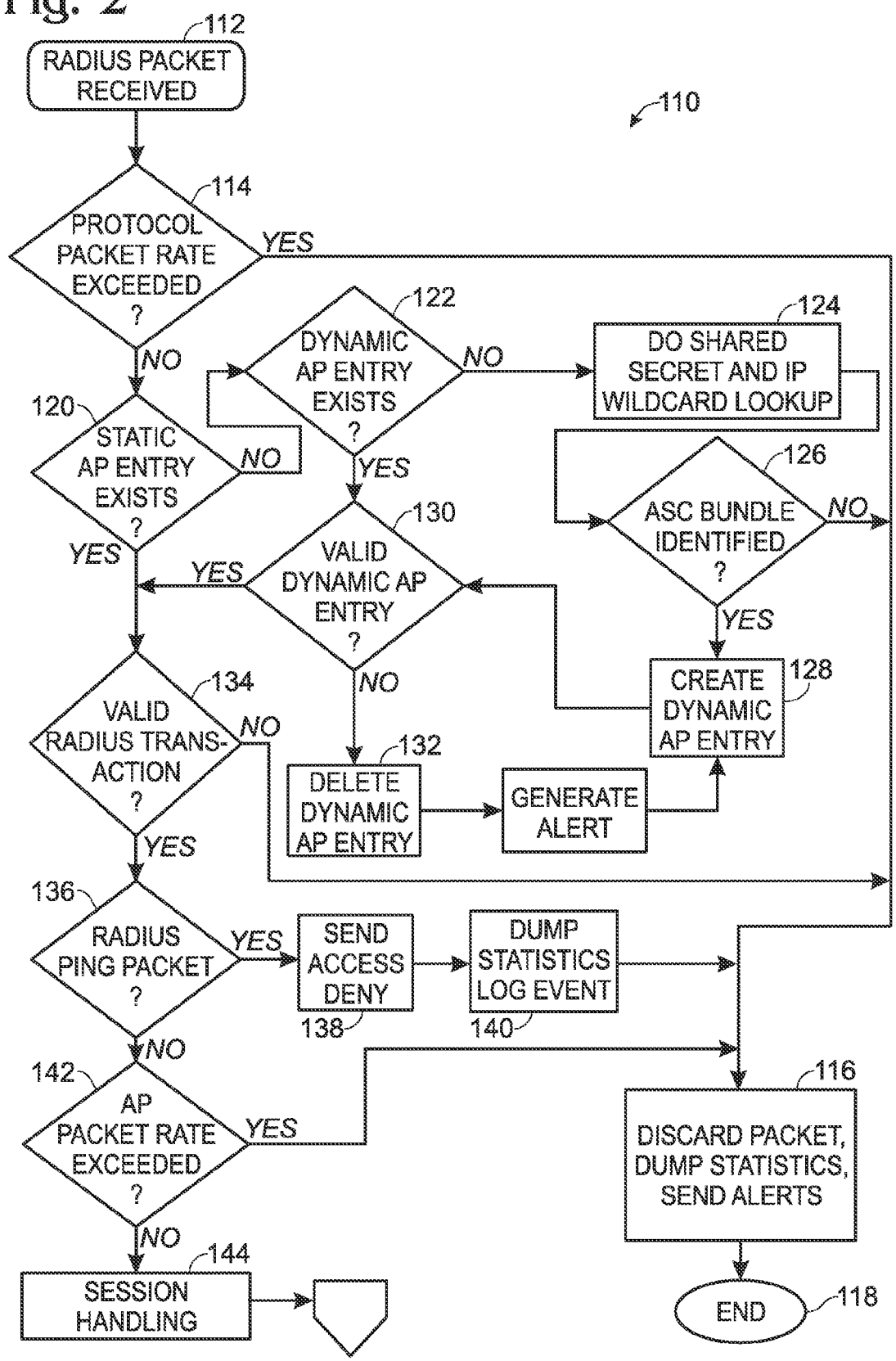

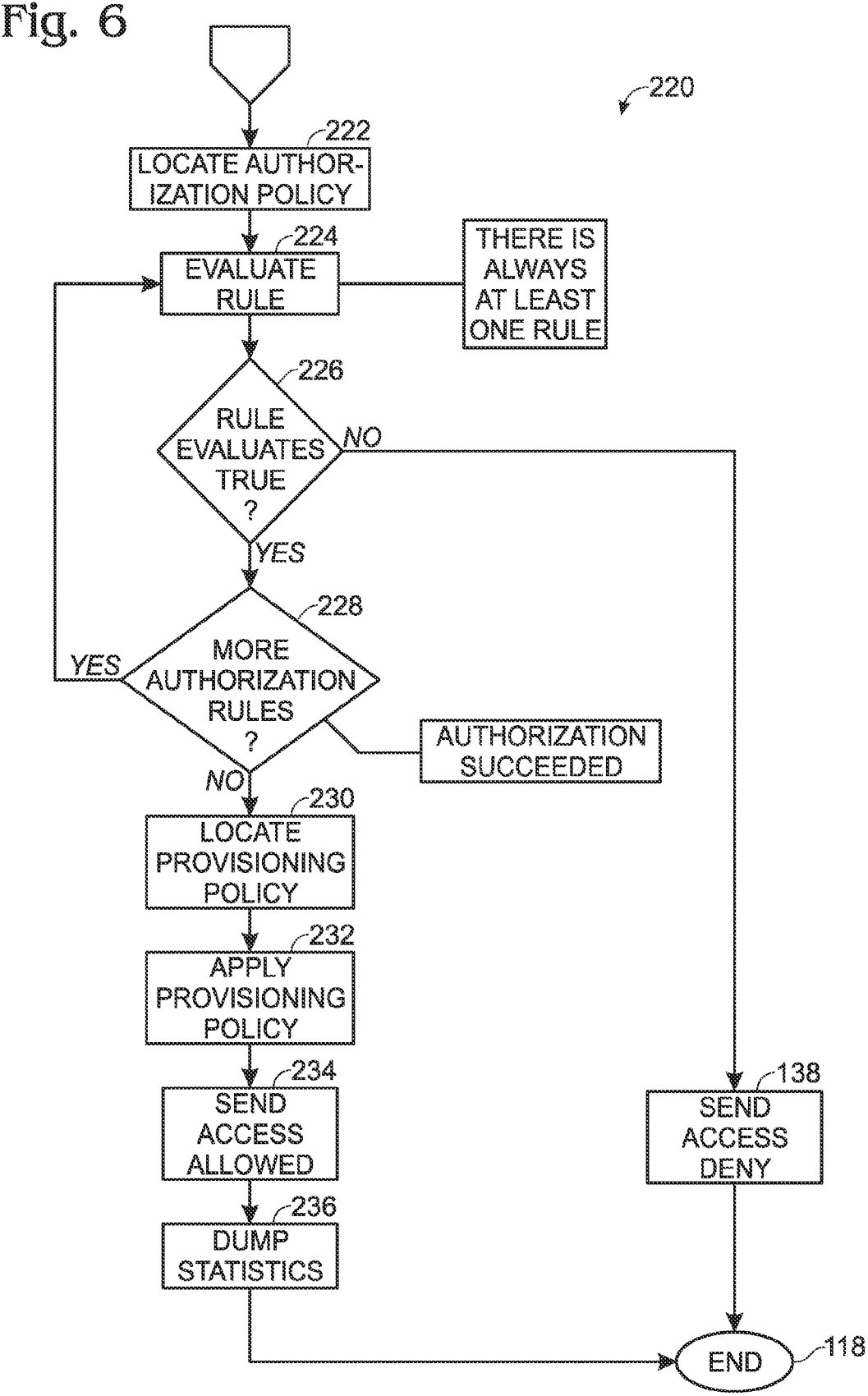

SEGMENTED NETWORK IDENTITY MANAGEMENT

CROSS REFERENCE TO RELATED APPLICATIONS

This application is a U.S. national phase application of International Application No. PCT/US2006/029605 filed on Jul. 28, 2006 and published in English on Feb. 8, 2007 as International Publication no. WO2007016436, and which claims priority to U.S. Provisional Application No. 60/703,685 filed on Jul. 29, 2005. Both of which are hereby incorporated by reference in their entirety for any and all purposes.

BACKGROUND OF THE INVENTION

1. Field of the Invention

The present invention relates generally to authentication and authorization policies for network access services, and more particularly to a segmentation of such policies into sub-policies to support multiple types of access services for a network simultaneously with different policies for each type of service being defined.

2. Description of the Related Art

Authentication of a user prior to access into a network being granted generally protects the network from unauthorized access. Authorized users of a network may exemplarily be subscribers of an internet service provider that provides web access services over the Internet or employees of an enterprise that provides corporate enterprise services over a local area network. In either event, before the user may gain access to the network, the user typically provides a user name and a password from the user interface of the device used to access the network, and if the user name and password are recognized and deemed valid, the user is then authorized to access the network through such device.

Many different network access policies and authentication protocols are well-known and, accordingly, need not be set forth herein in detail. However, several different commonly encountered authentication protocols are generally described below so that a greater appreciation of the advantages and features of the present invention may be obtained.

One well-known authentication protocol is the Remote Authentication Dial-In User Service (RADIUS) protocol. The RADIUS protocol is a client/server protocol and was originally developed as a network access server authentication and accounting protocol. The RADIUS client is typically a network access server and the RADIUS server is usually a daemon process or service running on another computer in network communication with the network access server.

Upon the user initiating a connection from the user device to the network access server, the network access server prompts the user for a user name and password, and the user replies causing the username and password to be sent to the network access server. The network access server, acting as the RADIUS client, sends an Access-Request packet containing the user name and encrypted password to the RADIUS server. In response to receipt of the Access-Request from the RADIUS client, the RADIUS server searches a database for the username listed. If the username is found and the password is correct, the RADIUS server then returns an Access-Accept response to the RADIUS client. Upon receipt of the Access-Accept response the user becomes authenticated on the network access server and thus obtains access to the network that the network access server protects. If the username does not exist in the database, the RADIUS server returns an Access-Reject message, which may further be accompanied by a text message to be forwarded by the RADIUS client to the user indicating the reason for the refusal.

In the example above the connection between the user device and the network access server is governed by the Point-to-Point Protocol (PPP). PPP has evolved beyond its original use as a dial-up access method and is now also used by some ISPs for DSL and cable modem authentication, in the form of PPP over Ethernet (PPPoE). PPP is part of the Layer 2 Tunneling Protocol, and also includes an authentication protocol that provides a prompt for a user name and password as described above.

The user name and password combination is the most common method for providing basic security from unauthorized access to networks. There are also more robust protocols for controlling network access and authenticating users that are well known. One such protocol is the Extensible Authentication Protocol (EAP). EAP sits inside of the PPP authentication protocol and provides a standardized framework for several different authentication methods so that the network access server does not need to be cognizant end of the authentication protocol being used. A network access server that supports EAP does not act as middle man in the authentication process described above, but just packages and repackages EAP packets received from the user device to hand off to a RADIUS server that will do the actual authentication.

In addition to user authentication as described above, wherein the user may access the network from any port provided by a network access server, network access may also be controlled by enabling and disabling the physical or logical port to which the user device is attached. Port access control is particular useful for controlling access to wireless local area networks wherein an unauthorized user device may establish an active link with a port of a wireless router.

One port based access control system is the IEEE 802.1x standard, which is a standard for passing EAP over a wired or wireless local area network (LAN). In an 802.1x compliant system, EAP messages are encapsulated in Ethernet frames instead of sitting inside of PPP packets. Accordingly, 802.1x provides for authentication and no other service, which may be desirable when using protocols other than TCP/IP, or where the overhead and complexity of using PPP is undesirable.

In the terminology of the 802.1x standard, the user device that wants to be authenticated is called a supplicant. The server doing the authentication, typically a RADIUS server, is called the authentication server. The device in between a supplicant and the authentication server, such as a wireless access point or port of a network access server, is called the authenticator. An advantage of the 802.1x standard is that the authenticator simply passes frames encapsulating the EAP packets between the supplicant and the authentication server. The protocol in 802.1x is called EAP encapsulation over LAN (EAPOL), and is currently defined for Ethernet-like LANs including 802.11 wireless, as well as token ring LANs.

Generally, the authenticator sends an "EAP-Request/Identity" packet to the supplicant as soon as it detects that the link is active (e.g., the supplicant system has associated with the access point). This packet is then passed on to the authentication (RADIUS) server. The authentication server sends back a challenge to the authenticator, such as with a token password system. The authenticator unpacks this from IP and repackages it into EAPOL and sends it to the supplicant. Different authentication methods will vary this message and the total number of messages, EAP supports client only authentication and strong mutual authentication, the latter being particularly useful for wireless LANs. The supplicant responds to the challenge via the authenticator and passes the response onto the authentication server. If the supplicant provides proper identity, the authentication server responds with a success message, which is then passed onto the supplicant. The authenticator now allows access to the LAN. However, the access may possibly be restricted based on attributes that came back from the authentication server. For example, the authenticator might switch the supplicant to a particular virtual LAN or install a set of firewall rules.

In an enterprise environment, a user may be granted access to the enterprise network in various ways. The user may have any or all of a desktop computer hardwired to a network switch, a wireless laptop, a personal digital assistant (PDA) and an internet enable cellular telephone, all of which may be used to access the network using one of the various known authentication protocols. Such user may also have another desktop computer on a home network that may access the enterprise network through a virtual private network (VPN). Should this home network also be wireless, the wireless laptop may also use the VPN. The wireless laptop, the PDA or the cell phone may further be used to access the enterprise network from wherever a connection to the Internet may be established, such as from publicly available "hot spots" in airports and Internet cafes.

Although any known authentication protocol may be used as appropriate for the connection to be made to the enterprise network, the enterprise administrator does not have available any known unified system or method to implement authentication policies for each user, or class of users, whom may access the enterprise network. For example, one particular user may need permission to access the enterprise network from any access point, whereas another user for security reasons is to be restricted to use of the hardwired desktop. Although it may possible to restrict access based on the type of access point, such that a user name and password is authenticated only if the access point attributes in the request also match the access point attributes authorized for the user in the authentication server, it would appear that reliance upon such attribute matching would unduly burden the enterprise administrator and otherwise not provide any flexibility by allowing the enterprise administrator to author different authentication policies for each type of access. Accordingly, there exists a need to provide an ability to author and apply different policies to different types of network access.

SUMMARY OF THE INVENTION

It is accordingly a primary object of the present invention to provide the ability to author and apply different policies to different types of network access.

According to the broadest aspects of the present invention, authentication and authorization to determine access rights of a user on a network in response to receipt of an authentication protocol request packet sent by an authenticator uses an access service category associated with the authentication protocol request packet, a credential validation policy associated with the access service category and an authorization policy also associated with the access service category. The authentication protocol request packet contains credentials to be validated in accordance with the credential validation policy. The user is authenticated in the event the credentials are validated. The authorization policy has at least one rule and further has a provisioning policy associated therewith. The rule of the authorization policy is evaluated for the user. The user is authorized on the network in the event the rule evaluates as true. The provisioning policy associated with the authorization policy is applied in response to the user being authorized. The user is allowed a connection to the network in accordance with the provisioning policy.

A feature of the present invention is the service category that exists at the top level. The service category associates a set of authenticators and a set of authentication and authorization policies. When a user attempts to connect to the network through an authenticator, the service category for such authenticator is determined and the authentication and authorization policies are applied. A further feature of the present invention is that these policies are segmented into several sub-policies to support multiple services and apply different authentication and authorization policies for each type of service. In various aspects of the present invention, these sub-policies are an outer tunnel policy, a credential validation policy, an inner tunnel policy and an authorization policy. Successful negotiation of each policy allows the user to connect to the network.

These and other objects, advantages and features of the present invention will become readily apparent to those skilled in the art from a study of the following Description of the Exemplary Preferred Embodiments when read in conjunction with the attached Drawing and appended Claims.

BRIEF DESCRIPTION OF THE DRAWING

FIGS. 1A-K depict a static structure Unified Modeling Language diagram showing objects and the relationship between objects for an identification system constructed in accordance with the principles of the present invention;

FIG. 2 is a flow chart of RADIUS transaction processing performed by the authentication and authorization system of the present invention;

FIG. 6 is a flowchart of the authorization process performed by the authentication and authorization system of the present invention.

DESCRIPTION OF THE EXEMPLARY PREFERRED EMBODIMENTS

Described herein is an authentication and authorization system to manage multiple types of access services to a network, and the policies to be applied to such services. The network may be any type of public, quasi-public or private network. The authentication and authorization system is described in terms of its software architecture, its method of operation and its database schema. Its software architecture is described in reference to FIGS. 1A-K, its method of operation described in reference to FIGS. 2-6, and its database objects and database schema are attached as an appendix hereto.

For purposes of the present specification, an authenticator is any device that sends identity authentication and authorization requests to the authentication and authorization system of the present invention. As described in greater detail below, the authentication and authorization policies are those specific policies associated with the authenticator and are segmented into several sub-policies. The segmentation of authentication and authorization policies, as will become apparent from the following description, enables multiple access services to the network to be supported and further enables different authentication and authorization policies for each type of service to be applied.

Referring now to FIGS. 1A-K, there is shown a static structure unified modeling language architecture 10 for the authentication and authorization system. The architecture 10 consists of an object hierarchy and the relationships between the objects.

The highest level concept of the architecture 10 is that of a service category, which is used to associate a set of authenticators and a set of authentication and authorization policies to a particular type of network access service. At this highest level concept of the architecture 10 are a service category manager 12 and a service category 14. The service category manager 12 is a single instance of a container that may store multiple instances of the service category 14 as an unordered collection of service categories.

Figure 1B:
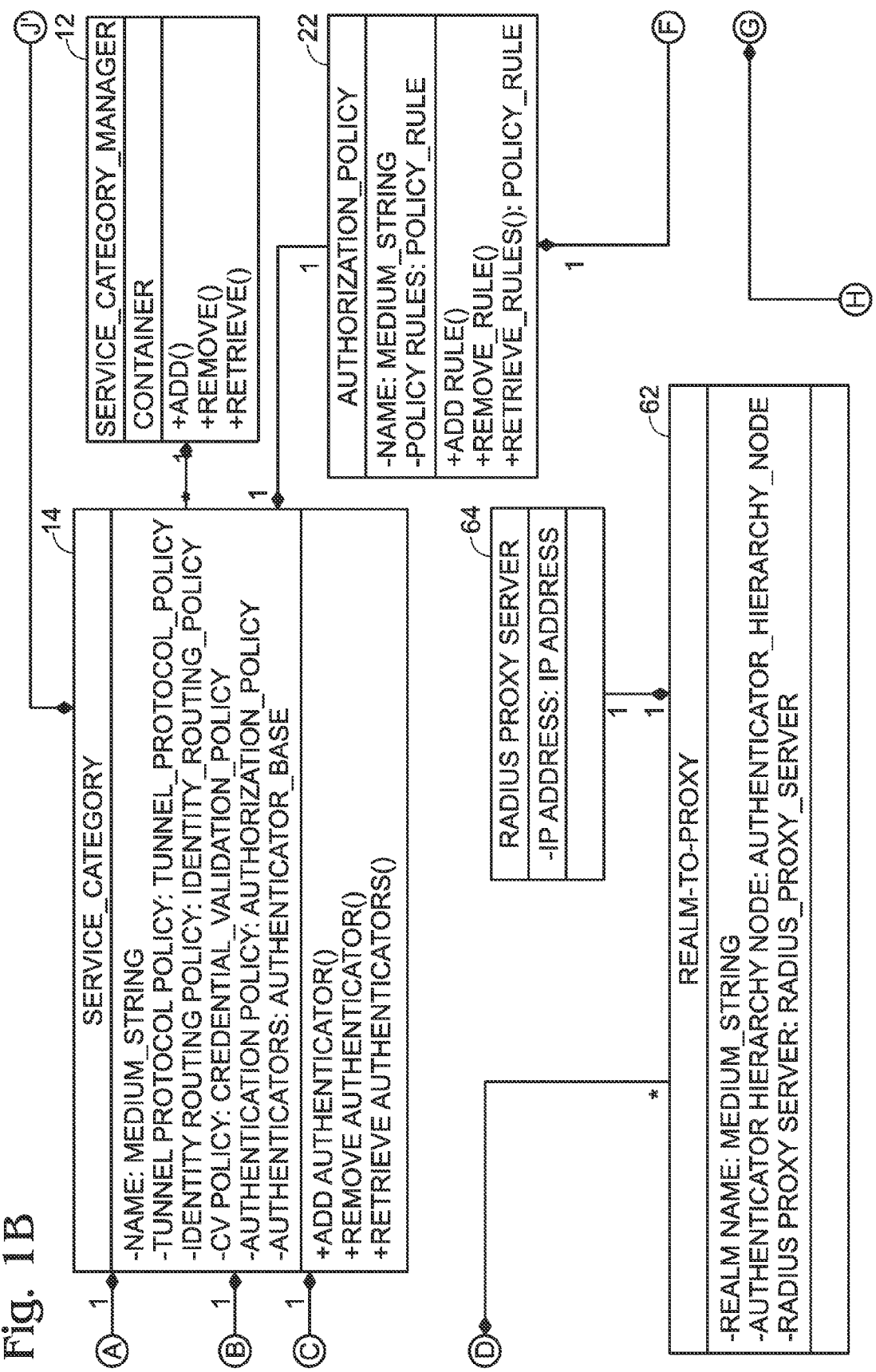

The method definitions and operations defined for the service category manager 12 for managing each instance of a service category 14, as seen in FIG. 1B, are as follows. Accordingly, there exists a need to provide an ability to author and apply:

| Definition | Operation |
|---|---|
| Add( ) | Add a new Service Category |
| Delete( ) | Delete an Existing Service Category |
| Retrieve( ) | Retrieve Existing Service Categories |

Add( ) defines a method to add a new instance of a service category 14 to the container of the service container manager 12, and Delete( ) defines a method to delete an existing instance of a service category from the container of the service container manager 12. Retrieve( ) defines a method to retrieve an unordered list of all instances of the service category 14 or a specific instance of a service category 14 by its reference key from the container of the service container manager 12. All the definitions for the service category 12 are public.

Each instance of the service category 14 associates a type of network access service with a set of authenticators and a set of authentication and authorization policies. These policies are applied to users who request access using that type of network service. The set of policies necessary to define completely the authentication and authorization behavior is divided into several sub-policies. These sub-policies, described in greater detail herein below, are a tunnel protocol policy 16, an identity routing policy 18, a credential validation policy 20, and an authorization policy 22. Contained within the authorization policy 22 is a provisioning policy 24, which is a set of actions.

Each instance of the service category 14 contains a reference to a single instance of each of the tunnel protocol policy 16, the identity routing policy 18, the credential validation policy 20 and the authorization policy 22. As best seen in FIG. 1, each of these sub-policies is a composition of the service category 12 such that the sub-policies have the same lifetime and scope as the service category 14 to which they belong. Alternatively, a reference may be used so that the sub-policies can be shared between different instances of service categories 12.

The service category 14 may be defined by its attributes, as seen for instance in FIG. 1B, as follows:

| Description | Data Type | Notes |
|---|---|---|
| Service Category Name | Medium String | Required |
| Tunnel Protocol Policy | Reference | Required |
| Identity Routing Policy | Reference | Required |
| Credential Validation Policy | Reference | Required |
| Authorization Policy | Reference | Required |
| Authenticators and Bundles | Container | Filled in by software. |

From the above attributes it is seen that each instance of the service category 14 owns an associated set of authenticators and authenticator bundles, as a corresponding instance of an authenticator base object as hereinafter described, that may be added to or deleted from a container within the service category 14. This container may store its items as an unordered list. An authenticator bundle is a defined group of authenticators.

Deleting any instance of the service category 14 has the potential to leave data objects within the system in an inconsistent state. Therefore, in a preferred embodiment of the present invention, a service category should only be deleted if there are no authenticators or authenticator bundles associated with the service category 14. If the service category 14 contains one or more authenticators or authenticator bundles, any attempt to delete it may be handled by a database layer, constructed in accordance with the attached database schema, that may use constraint checking to detect the situation and raise an exception. If it is desired to delete any instance of the service category 14, all authenticators and authenticator bundles may be first manually delete from such service category 14 before the service category delete operation is allowed.

The method definitions and operations defined for the service category 14, as seen for instance in FIG. 1B, are as follows:

| Definition | Operation |
|---|---|
| AddAuthenticator( ) | Add an Authenticator or Authenticator Bundle |
| RemoveAuthenticator( ) | Delete an Authenticator or Authenticator Bundle |
| RetrieveAuthenticator( ) | Retrieve the Set of Authenticators or the Set of Authenticator Bundles |

AddAuthenticator( ) defines a method to add an authenticator or an authenticator bundle to the container of the service category 14, and RemoveAuthenticator( ) defines a method to delete an authenticator or an authenticator bundle from the container of the service category 14. RetrieveAuthenticator( ) defines a method to retrieve the set of authenticators or the set of authenticator bundles from the container of the service category 14. Additional operations defined for the service category 14 may include definitions for methods to create a new service category, edit an existing service category and rename the service category. All of the definitions for the service category 14 are public.

The architecture 10 may further include contain a default service category so that the invention may be practiced without creating unnecessary configuration elements. Preferably, a default service category may have any name desired, but should otherwise be prevented from being deleted. Any name may be selected for the default service category; however, it should be identified by its reference key and not its name.

Another top level concept of the architecture 10 is that of the authenticator. As stated above, an authenticator is any device that sends identity authentication and authorization requests to the system of the present invention. Exemplarily, an authenticator may use the RADIUS protocol to negotiate such request, however, other protocols may be used. Authenticators may be added to the system as individual devices. Furthermore, groups of authenticators may be conveniently added to the system using the concept of the authenticator bundle.

Authenticators and authenticator bundles are owned by a single instance of the service category 14, as described above. In addition to this ownership, the below described authenticator hierarchy facilitates the organization of authenticators and authenticator bundles by allowing them to be associated with named groups within a hierarchy and use those group names for authorization policy evaluation. As will become apparent from the description below, authenticators and authenticator bundles may be associated with none, one or more than one named groups within the hierarchy.

As best seen in FIG. 10, an authenticator hierarchy 26 is an arbitrary hierarchy of named groups, the hierarchy being used to organize and manage authenticators and authenticator bundles. Each named group is represented as an instance of an authenticator hierarchy node 28 within a tree.

The top-level named group, or root node, may initially be named "default" but any name may be selected. Irrespective of the name selected for the default group, in a preferred embodiment of the present invention the default group should not be deleted. Accordingly, the. default group is preferably identified using its database reference key and not its name.

Each instance of the authenticator hierarchy node 28 in the authenticator hierarchy 26 may be defined by its attributes as follows:

| Description | Data Type | Notes |
| --- | --- | --- |
| Name | Medium String | Required |
| Parent Node | Reference to this node's parent | Filled in by software |
| Child Nodes | Collection of references | Filled in by software |
| Authenticators | Collection of references | Filled in by software |

Deleting any instance of the node 28 and its children from the hierarchy may potentially leave data objects within the system in an inconsistent state. Therefore, should an attempt be made to delete any instance of the node 28 that contains one or more authenticators, an exception should be raised. Preferably, all authenticator or authenticator bundles associated with an instance of the node 28 should be deleted in the authentication hierarchy before deletion of any instance of the node 28 and any child nodes thereof. The database layer set forth in the attached database schema is preferably responsible for detecting the deletion and raising the exception.

Furthermore, as best seen in FIG. 1, there may be a dependency between policy rules, as herein below described, of the authorization policy 22 and any instance of the authenticator hierarchy node 28. Preferably, the database layer should further prevent an instance of the authenticator hierarchy node 28 from being deleted if it is being used inside a policy rule of the authorization policy 22. If such an attempt is made, the database layer should raise an exception and prevent the node 28 from being deleted.

The method definitions and operations defined for the authenticator hierarchy node 28, as seen for instance in FIG. 10, are as follows:

| Definition | Operation |
| --- | --- |
| AddNode( ) | Add a Child Node |
| AddAuthenticator( ) | Add an Authenticator or an Authenticator Bundle |

-continued

| Definition | Operation |
| --- | --- |
| RemoveAuthenticator( ) | Remove an Authenticator or an Authenticator Bundle |
| RetrieveAuthenticator( ) | Retrieve an Authenticator or an Authenticator Bundle |
| RetrieveChildNodes( ) | Retrieve List of Child Nodes |
| Remove( ) | Remove and Delete the Node |

AddNode( ) defines a method to add a child node to any instance of the authenticator hierarchy node 28. AddAuthenticator( ) defines a method to add an authenticator to the authenticator hierarchy node 28 or add an authenticator bundle to the authenticator hierarchy node 28. RemoveAuthenticator( ) defines a method to remove an authenticator from the authenticator hierarchy node 28 or remove an authenticator bundle from the authenticator hierarchy node 28. RetrieveAuthenticator( ) defines a method to retrieve an ordered list of all authenticators from the authenticator hierarchy node 28 or retrieve an ordered list of all authenticator bundles from the authenticator hierarchy node 28. RetrieveChildNodes( ) defines a method to retrieve an ordered list of all child nodes from the authenticator hierarchy node 28. Remove( ) defines a method to remove and delete an instance of the authenticator hierarchy node 28. A method may also be defined for renaming a node. All of the definitions for the authenticator hierarchy node 28 are public.

An authenticator to be recognized by the authentication and authorization system of the present invention is added to the system as an instance of the authenticator base 30. As best seen in FIG. 1, an instance of the authenticator base 30 is owned by an existing instance of an existing service category 14 that the authenticator will use.

Accordingly, to add an authenticator to be recognized by the system, an instance of the service category 14 that such authenticator will use must first be selected. In the event this instance of the service category 14 does not exist, it must then be added. Once the service category 14 has been selected or added, the new instance of the authenticator base 30 may be added for this authenticator. The fields, described below, in the authenticator base 30 for the new authenticator are then completed to define the authenticator. The instance of the authenticator base 30 for the authenticator is then added to the selected service category 14. This instance of the authenticator base 30 may also be associated with one or more nodes within authenticator hierarchy 26, as described below.

Figure 1C:
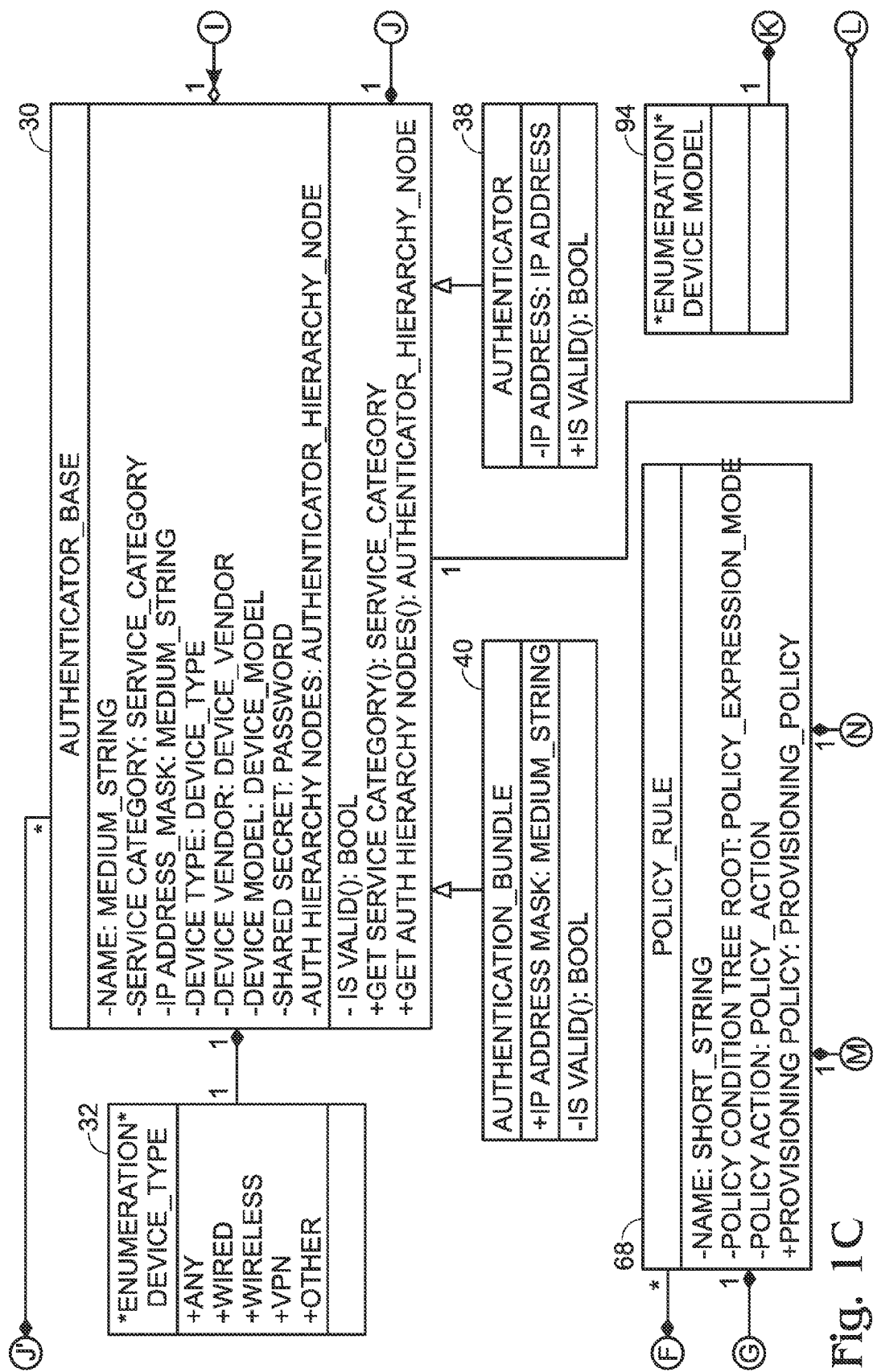
Figure 1D:
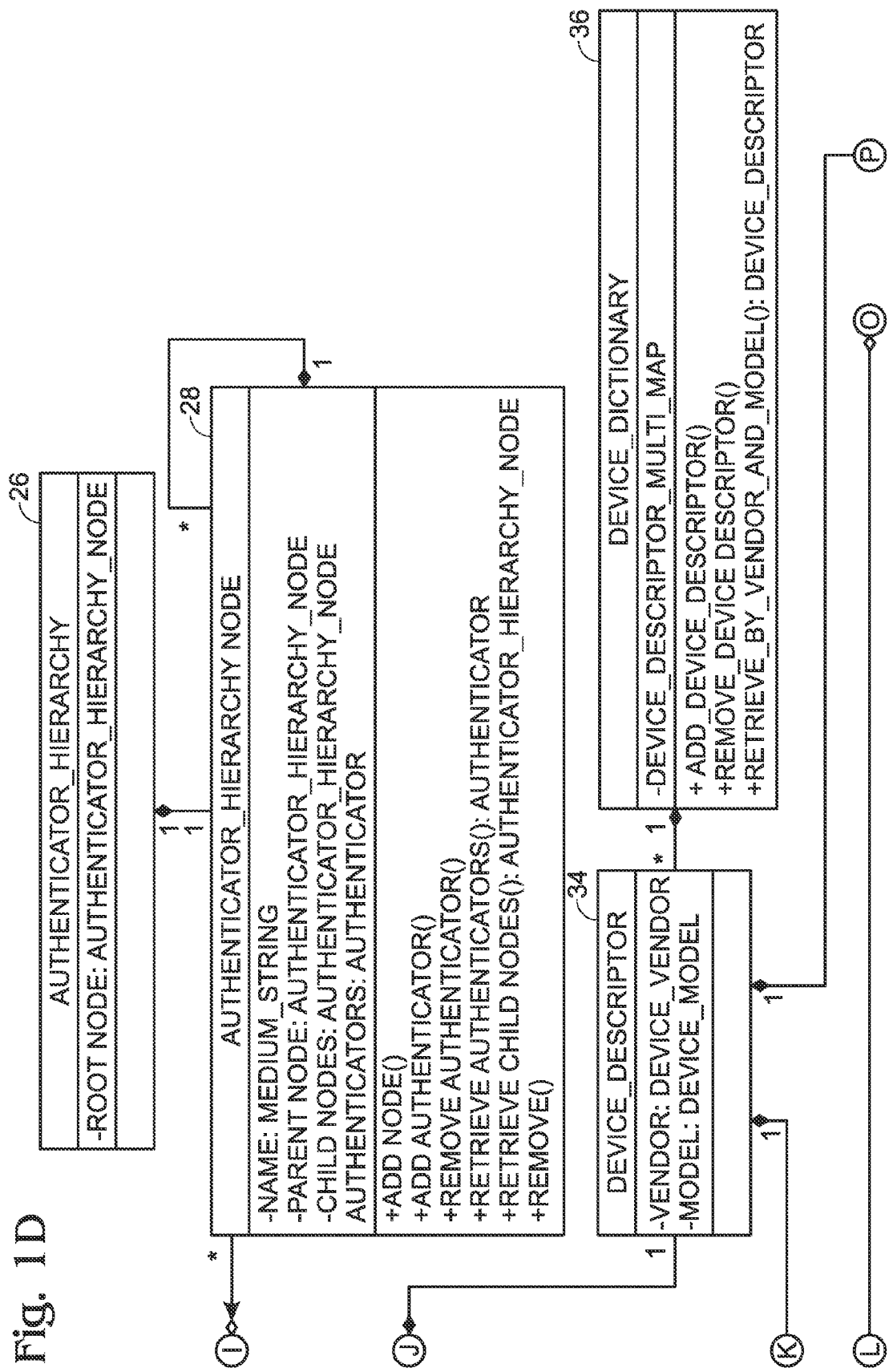

The authenticator may be defined by its attributes of the authenticator base 30, as seen in FIG. 1C, as follows:

| Description | Data Type | Notes |
| --- | --- | --- |
| Name | Median String | Required |
| Service Category | Reference | Filled in by software |
| IP Address | IP Address | Required |
| Device Type | Enumeration | Required |
| Device Vendor | Enumeration | Optional |
| Device Model | Enumeration | |
| Shared Secret | Password | Required |
| Authenticator Hierarchy Nodes | Collection of References | Filled in by software |

The service category field of the authenticator base 30 enables the service category 14 for an authenticator to be looked up when the authentication and authorization system is processing an authentication request from such authenticator. The service category field is populated by the system and need not be visible to the user.

The device type field of the authenticator base 30 is used to identify the type of service associated with the authenticator. It is also one of the attributes that may be used inside policy rules within the authorization policy 22. The value of the device type field may be populated based on a selection from a pulldown list of available types in a device type enumeration 32. As best seen in FIG. 1C, the enumerated values for this field are: ANY, WIRED, WIRELESS, VPN and OTHER. The default value is ANY.

The device vendor and device model fields of the authenticator base 30 identify the manufacture and model number for the authenticator. The values of these two fields for each instance of the authenticator base 30 map to a valid entry in a corresponding instance of a device descriptor 34 which is co-owned by the corresponding instance of the authenticator base 30 and a device dictionary 36, which is described in greater detail below. Since model numbers populating the device model field are dependent on the vendor entry in the device vendor field, selection of a particular vendor necessitates a corresponding selection of a particular model number made available by such vendor.

The authenticator hierarchy nodes field of the authenticator base 30 is a connection of references to nodes in the authenticator hierarchy 26 to which the authenticator has been assigned. The IP address field is populated by user entry of the IP address of the authenticator in accordance with an authenticator object 38.

The method definitions and operations defined for the authenticator base 30, as seen in FIG. 1C, are as follows:

| Definition | Operation |
| --- | --- |
| IsValid( ) | |
| GetServiceCategory( ) | Retrieve the corresponding service category |
| GetAuthenticatorHierarchyNodes( ) | Retrieve the set of authenticator hierarchy nodes |

In addition to the operations defined above, additional operations that may be required for the authenticator base 30 include create a new authenticator, added an existing authenticator and delete an existing authenticator. All of the definitions for the authenticator base 30 are public.

The authenticator base 30 may also be used to add authenticator bundles to the authentication and authorization system. As set forth above, an authenticator bundle is defined group of authenticators. By using an authenticator bundle, several authenticators may be added to the authentication and authorization system without having to create in individual entry in the authenticator base 30 for each individual authenticator within the bundle.

The authenticator bundle is defined by an authenticator bundle object 40 for which its attribute is an IP address subnet. Each authenticator bundle is further associated with a shared secret, which is one of the attribute fields of the authenticator base 30. Preferably, the authentication and authorization system will respond to a request from all authenticators with IP addresses that lie within a specified subnet, if and only if the request is encrypted using the corresponding shared secret.

Optional equipment vendor and equipment model selections of the device descriptor 34 may also be associated with the authenticator bundle. The selections are useful when the authenticator bundle contains equipment that uses the same device dictionary 36 to support vendor specific functionality. For example, a single vendor manufactures all the equipment in the bundle, or all of the equipment in the bundle is the same model of a particular vendor's equipment. Additionally, all the equipment in the bundle may support a single technology, for example VoIP.

There are three different possibilities when authenticating a device within an authenticator bundle. If the vendor for the device is specified and the device model is not specified, the authentication and authorization system will use the vendor device dictionary when processing RADIUS request from the authenticator. If the vendor and model are both specified, the authentication and authorization system will use the specific device dictionary for that equipment or technology. If the vendor and model are not specified, the authentication and authorization system will use the generic RADIUS device dictionary.

And authenticator bundle is defined by the same attributes of the authenticator base 30 as described above. The IP address field of the authenticator base 30 is populated by the IP address mask entered as an attribute in the authenticator bundle object 40. Otherwise, the functionality of the authenticator base 30 foreign authenticator bundle is identical to that as described above for an individual authenticator. Similarly, the method definitions for authenticator bundle are identical to the method definitions required for an authenticator.

It may also be possible to add a multifunction authenticator, which is a network access device capable of several types of simultaneous network service, to the authentication and authorization system. An example of such a multifunctional authenticator may be an access point with both wireless and wired switch capabilities. When the authentication and authorization system receives an authentication request from multifunction authenticator, decides which access type is being used for the request and uses that information to locate the correct service category.

Another concept of the architecture 10 is that of directory services. Generally, a directory service defines the information necessary for the authentication and authorization system to locate and connect to a backend directory service, such as Active Directory or LDAP. Each directory server must include a primary directory server and may include an optional entry for secondary backup directory server. Anywhere a directory service is used in a directory set, a local embedded user store may also be used. The concepts of the directory set and embedded user store are set forth in greater detail below following the immediately ensuing description of the objects of the architecture 10 that comprise the directory services.

Referring again to FIG. 1, a directory service manager 42 manages each in stance of a directory service 44 within the authentication and authorization system. The directory service manager 42 is a single instance of an unordered container to save references to each instance of the directory service 44 that exist within the authentication and authorization system.

As stated above, the embedded user store can be used anywhere a directory service can be used. This is accomplished by always maintaining an embedded user store entry within the directory service manager 42. This behavior should be achieved using polymorphic objects to represent an entry for either the local embedded user store or for any directory service entries that are created in the authentication and authorization system.

Figure 1E:
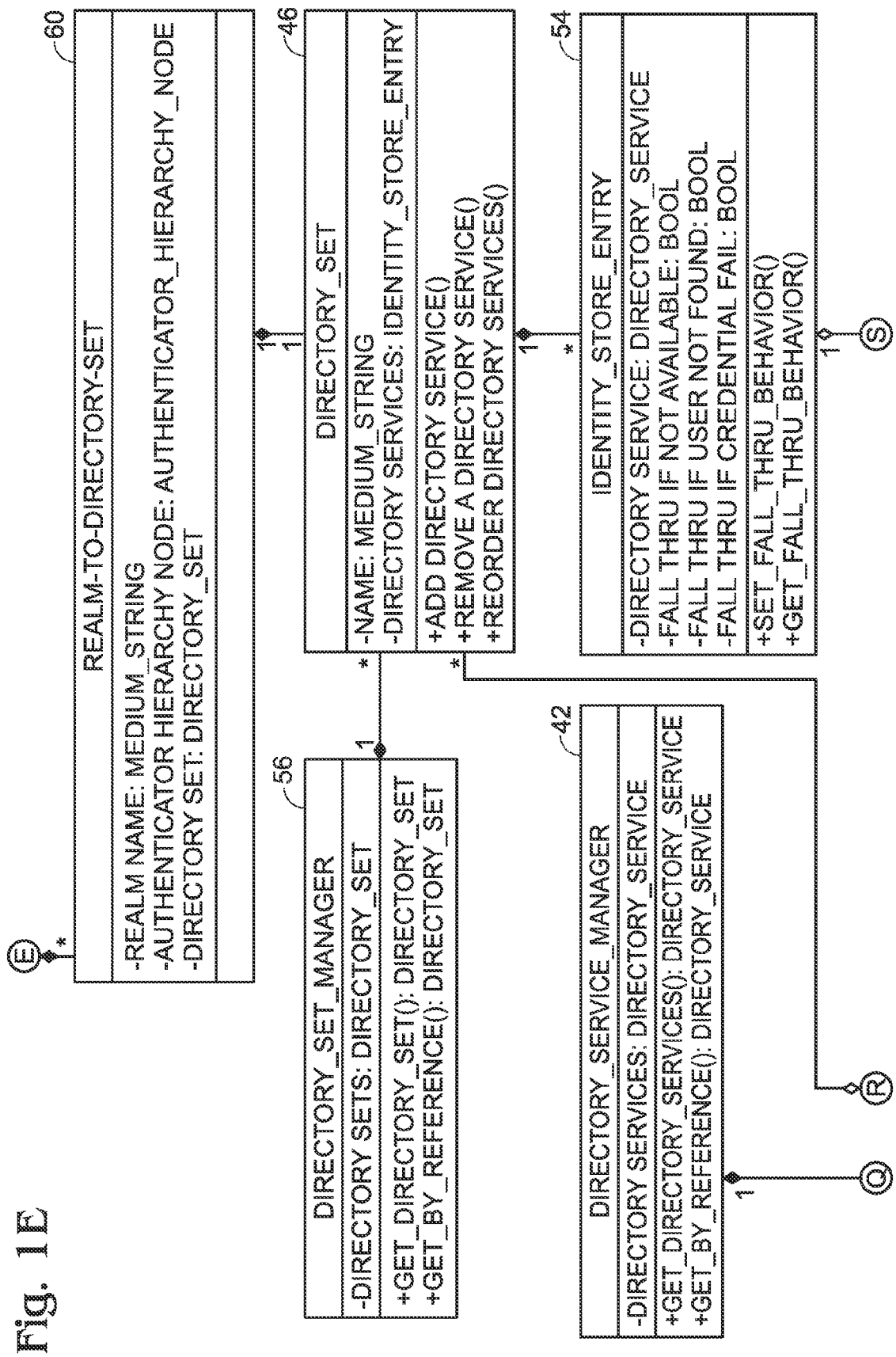

The method definitions and operations defined for the directory service manager 42, as seen in FIG. 1E, are as follows:

| Definition | Operation |
| --- | --- |
| Add( ) | Add a new directory service |
| Delete( ) | Delete an existing directory service |
| GetDirectoryServices( ) | Retrieve all existing directory service entries |
| GetByReference( ) | Retrieve a single directory service entry using a reference key |

Each of the forgoing is a public method definition.

Each instance of the directory service 44 defines the information necessary for the authentication and authorization system to locate and connect to a backend directory service, such as active directory or LDAP. Each instance of the directory service 44 includes a reference to a primary directory server and may include an optional entry for secondary backup directory server.

An instance of the directory service 44 may not be deleted if it is being used by a directory set 46, which is described below. Should an attempt be made to delete an instance of the directory service 44, the authentication and authorization system should raise an exception, abort the delete operation and alert the user. Preferably, before any instance of the directory service 44 is a lot to be deleted, such instance should be manually disassociated from any directory set 46 that is using it.

An instance of the directory service 44 may be defined by its attributes, as seen in FIG. 1I, as follows:

| Description | Data Type | Notes |
| --- | --- | --- |
| Name | Medium String | Required |
| Service Type | Enumeration | Required |
| Directory Sets | Collection of references | Filled in by software |
| Security Protocol | Enumeration | Required |
| Server Password | Password | Required |
| Strip Realm | Boolean | Required |
| Primary Server IP Address | IP Address | Required |
| Primary Server Port | IP Port | Required |
| Secondary Server IP Address | IP Address | Optional |
| Secondary Server Port | IP Port | Optional |
| Server Connect String | Medium String | Filled in by software |
| Server Connect User | Short String | Required |
| User Root Distinguished Name | Medium String | Required |
| Directory Root Distinguished Name | Medium String | Required |

The directory sets field provides back-navigability to all directory sets that are using this directory service. The service type field indicates the type of directory service this entry describes. Exemplarily, allowing values for this field may be LDAP or ACTIVE DIRECTORY. It is to be understood that other values for this field may also be used.

The security protocol field is used to define the mechanism by which the authentication and authorization system should establish a secure connection with the directory server. It also implies the type of credential required to establish a secure tunnel. The user interface should allow the selection of a security protocol and use this information to ask for either a password or certificate, as indicated by the data type password object 48. This implies an interaction with a certificate manager. Exemplary valid values for this field are SASL and NONE, as a seen in the enumeration security protocol object 50.

The strip realm field allows for whether the realm should be removed from the username before it is submitted to the backend directory as part of the authentication transaction.

The method definitions and operations defined for each instance of the directory service 44 are as follows:

| Definition | Operation |
| --- | --- |
| Create( ) | Create a new directory service |
| Edit( ) | Edit an existing directory service |
| Delete( ) | Delete an existing directory service |
| Retrieve( ) | Retrieve a list of directory sets using the directory service |

As stated above, anywhere an instance of the directory service 44 is used in the directory set 46, the local embedded user store may also be used. This functionality is supported by the embedded user store entry. The embedded user store and the directory service 44 share similar capabilities. They are both derived polymorphically from an identity store 52, which encapsulates the common functionality.

The identity store 50 may be defined by its attributes, as seen in FIG. 1I, as follows:

| Description | Data Type | Notes |
| --- | --- | --- |
| Name | Medium String | Required |
| Service Type | Enumeration | Required |
| Directory Sets | Container of References | Filled in by software |

The service type field is selected form a service type enumeration 52, as best seen if FIG. 1I. The service type for the common functionality is EMBEDDED. The directory sets field provides back navigability to all directory sets that are using the embedded user store.

The aforementioned directory set 46 consists of an ordered list of instances of the directory service 44. The directory set 46 is used when the authentication and authorization system is processing authentication requests and needs to locate the authoritative user record for a user that generated a particular request. The administrator may create or modify A directory set may be created or modified by selecting previously defined instances of the directory service 44 and adding them to the directory set 46.

Additionally, a "fall through" behavior may be specified. A fall through behavior determines how the authentication and authorization system should proceed from one directory service 44 to the next when certain conditions occur. Such fall through conditions exemplarily include unable to connect two the directory server, user records not found for user authentication failed.

The directory set 46 is shareable between service categories. It may also be highly desirable to add a default directory service to the authentication and authorization system and use it for all authentication transactions. This potentially is desirable to avoid additional complexity and work needed to set up a directory set 46 for simple installations.

The directory set 46 is defined by its attributes, as best seen in FIG. 1E, as follows:

| Description | Data Type | Notes |
| --- | --- | --- |
| Name | Medium String | Required |
| Directory Services | Collection of Directory Service Entries | Required |

The directory services field is a collection of directory service entries needed to specify the desired fall through behavior for each directory service assigned to a directory set 46. If one of the fall-through flags is set true, then the authentication and authorization system will attempt to retrieve the user information record from the next directory service in the list, if it is present. Exemplary fall through conditions may be fall through it the directory service is not available, fall through if the user record is not found, or fall through if the user's credentials are invalid. This order is enforced during the authentication transaction processing. The system cannot locate the user's record if, for example, it cannot connect with the directory server.

A directory service entry in the directory services field of the directory set 46 is defined by the attributes of identity store entry object 54, seen in FIG. 1E, as follows:

| Description | Data Type | Notes |
| --- | --- | --- |
| Directory Service | Reference | Required |
| Fall Through if Not Available | Boolean | Required |
| Fall Through if User Not Found | Boolean | Required |
| Fall through if Credentials Fail | Boolean | Required |

The operations defined for the directory set 46, as seen from the method definitions of the directory set 46 and the identity store entry 54, are add a directory service to the directory set 46, delete the directory set 46, remove the directory service from the directory set 46, reorder directory services within the directory set 46, and specify the fall through behavior to each directory set 46.

A directory set manager 56 manages all instances of the directory set 46 within the authentication and authorization system. The direct reset manager 56 is a single instance of an unordered container to save references to each instance of the directory set 46.

The operations defined for the directory set manager 56, as seen from the method definitions of the directory set manager 56, are add a new directory set 46, remove an existing directory set 46, retrieve all existing directory sets 46, and retrieve a single directory set 46 using a reference key.

It is initially stated above that the set of policies necessary to define completely the authentication and authorization behavior is divided into several sub-policies. The authentication policy components are the tunnel protocol policy 16, the identity routing policy 18, and the credential validation policy 20.

The tunnel protocol policy 16 consists of the list of outer tunnel protocols, in priority order, for example, PEAP, TTLS, TLS. The protocol suite supported in the authentication and authorization system defines the available tunnel types.

The list of available tunnel types is statically defined within the user interface by the authentication and authorization system, as best seen as the tunnel type enumeration object 58. The credential type field of the tunnel type object 58 is used by the user interface to determine a user interface your prompt to select a certificate or password to use with each tunnel type selected. Certificates are configured using a certificate manager and may be shared across service categories.

A certificate that is being used by the tunnel protocol policy 16 or potentially other components within the system, should not be able to be deleted by a user of the system. Preferably, certificates are added and deleted using a certificate manager.

When EAP-PEAP is added to the tunnel protocol policy 16 of an instance of the service category 14, the cipher suite to use for the PEAP request received from authenticators associated with the that service category may be selected. The cipher suite consists of a list of cipher names. About twenty ciphers are typically used, and the user interface should provide a view of the list of supported ciphers so that ciphers to be enabled may be selected. Multiple ciphers simultaneously are further enabled for the same PEAP entry.

Some examples cipher names are:

TLS_RSA_WITH_NULL_MD5,

TLS_RSA_WITH_RC4_128_MD5, and

TLS_RSA_WITH_RC4_128_SHA.

The cipher named TLS_DHE_DSS_WITH_ 3DES_EDE_CBC_SHA is always present and enabled, and is preferably not be allowed to be disabled. The set of enabled ciphers for a PEAP tunnel is represented as a container of strings were each string contains the name of enabled ciphers.

Each instance of the service category 14 contains a single tunnel protocol policy 16. Preferably, each tunnel protocol policy 16 is not identified by name and is not shared between instances of the service category 14. However, the present invention contemplates that any tunnel protocol policy 16 may be named and shared between instances of the service category 14.

The tunnel protocol policy 16 is defined by its attributes, as best seen in FIG. 1A, as follows:

| Description | Data Type | Notes |
| --- | --- | --- |
| Name | Medium String | Contemplatedis |
| Outer Tunnel Types | Collection of Tunnel Types | Required |

The operations defined for the method definitions in each tunnel protocol policies 16 are add tunnel type to the policy, remove a tunnel type from the policy, and reorder tunnel types within the policy.

The identity routing policy 18 determines how the authentication and authorization system may handle user authentication request on a per-realm basis. The primary functionality allows a list of realms to be specified and each realm to be associated with the directory set 46 where a user's record might be found. These are called realm to directory set mapping. Additionally, these mapping may be constrained only at the users request originating from a particular group of authenticators in the authenticator hierarchy.

The authentication and authorization system extracts the realm from each authentication request and uses a realm to directory set mapping to locate the correct directory set 46 for users from that realm. The realm from the authentication request is compared to all the realms in the set of realm to directory set mappings and matched on a first match basis. The policy may contain entry where the realm name is NULL. the NULL realm name indicates the directory set 46 to use if none of the other name realms match the realm presented by the user.

The user interface of the authentication and authorization system must provide a facility to arrange the order of realm to directory set entries in the list. The wild-card character "*" may be used anywhere in the realm name to indicate that any character and at that position will match successfully. If all realm to direct reset mapping operation specified in the page have been attempted and the user record still cannot be found, then the user's authentication request has failed and the user must be rejected.

Two types of objects are needed to store the data values needed to define a single identity routing policy 18. As best seen in FIGS. 1A, B and E, a single policy requires one instance of the identity routing policy 18 and one instance of either a realm-to-directory set mapping 60 or a realm-to-proxy server mapping 62 for each realm that is defined within the policy.

The realm-to-directory set mapping 60 is defined by its attributes as follows:

| Description | Data Type | Notes |
| --- | --- | --- |
| Realm Name | Medium String | Optional |
| Authenticator Hierarchy Node | Authenticator Node | Optional |
| Directory Set | Directory Set Reference | Required |

The realm-to-proxy server mapping 62 is defined by its attributes as follows:

| Description | Data Type | Notes |
| --- | --- | --- |
| Realm Name | Medium String | Optional |
| Authenticator Hierarchy Node | Authenticator Node | Optional |
| RADIUS Proxy Server | RADIUS Proxy Server | Required |

Realm Name is the realm part of the username@realm, \\username\realm or //username/realm, excluding all the delimiters. The identification in authentication system will automatically separate the user name and realm from the users authentication request using an algorithm that will try each of the three common forms.

Authenticator Hierarchy Node allows the authentication and authorization system to be configured to only process authentication request from users on this realm if the authenticator, or the authenticator bundle, is a member of either this node, or child node, in the authenticator hierarchy 26.

Directory Set specifies the appropriate directory set 46 to use when looking up user records for this realm.

Radius Proxy Server specifies the IP address of the RADIUS proxy server. The authentication and authorization system will forward radius authentication request to this server if the realm and authenticator match the values contained within the request.

The RADIUS proxy server object 64, seen in FIG. 1B, is defined by its attributes as follows:

| Description | Data Type | Notes |
| --- | --- | --- |
| IP address | IP address | Required |
| IP port | IP port | Required |

The identity routing policy 18 is defined by its attributes as follows:

| Description | Data Type | Notes |
| --- | --- | --- |
| Realm-to-Directory Set Mappings | Container | Required |
| Realm-to Proxy Server Mappings | Container | Optional |

The operations for the method definitions in the identity routing policy 18 are and new Realm-to-Directory Set mapping, remove an existing Realm-to-Directory Set mapping, edit an existing Realm-to-Directory Set mapping, and new Realm-to-Proxy Server mapping, remove an existing Realm-to-Proxy Server mapping, and edit an existing Realm-to-Proxy Server mapping. Instances of the identity routing policy 18 are shareable across service category boundaries as long as they do not use authenticator attributes within the policy.

The credential validation policy 20 consists of a list of inner tunnel protocols, for example MSCHAPv2 and MD5, in priority order, as best seen as an inner tunnel type enumeration object 66. The authentication and authorization system will attempt to verify the user's credentials using each protocol specified in the list. Processing continues until one of the protocols results in a successful credential match, at which point, the user is authenticated.

Each instance of the service category 14 contains a single credential validation policy 20. Each instance of the credential validation policy 20 is preferably not identified by name and cannot be shared between instances of the service category 14. However, the present invention contemplates that the credential validation policy 20 may be named and shared between instances of the service category 14.

A credential validation policy 20 is defined by:

| Description | Data Type | Notes |
| --- | --- | --- |
| Name | Medium Stream | Reserved |
| Inner Tunnel Types | Collection of Inner Tunnel Types | Required |

The operations defined for method definitions of the credential validation policy 20 are add an inner tunnel type to the policy, remove an inner tunnel type from the policy, and reorder the inner tunnel types within the policy.

As seen in FIG. 1B and C, each instance of the service category 14 contains a single instance of the authorization policy 22. When a user authentication and authorization request arise from an authenticator, the authenticator base 30 is consulted to look up the service category 14 to which the authenticator belongs and applies the authorization policy 22 for that service category to the user's request. Although the architecture 10 of FIGS. 1A-K does not indicate that instances of the authorization policy 22 may be shared between instances of the service category, the present invention contemplates such sharing.

When a new instance of the service category 14 is created, the owned instance of the authorization policy 22 is preferably initialized to deny all authenticated users network access. To initialize, an instance of the authorization policy 22 is created with no policy conditions in a policy rule 68 and with a policy action enumeration object 70, owned by the policy rule 68, set to REJECT. The policy rule 68 is described in greater detail below. Because each instance of the authorization policy 22 is contained within a corresponding instance of the service category 14, each instance of the authorization policy 22 for it corresponding service category 14 is edited by editing the corresponding service category 14 and deleted by deleting the corresponding service category 14.

An instance of the authorization policy 22 consists of one or more authorization rules, wherein each rule corresponds to an instance of the policy rule 68. These rules are evaluated when processing each authentication and authorization transaction. Each authorization rule consists of a policy condition and a policy action, as seen in the attributes of the policy rule 68, and generally as described immediately below.

The policy condition consists of a Boolean expression, which contains one or more sub expressions. A sub-expression specifies an attribute, the comparison operation to perform on the value of that attribute, and an argument of the appropriate type for the comparison operation. As each policy rule is processed, the attribute will be located and the comparison operation using the attribute's current value and the argument will be invoked. The evaluation of each sub expression will return either a true or false Boolean result. The result of each sub-expression is combined with the results of all other sub-expressions to arrive at a Boolean result for the entire policy condition. Typically, a policy condition is created through the user interface of the authentication and authorization system to select an attribute, specify the operation to be applied to that attribute, and in most cases, entering an argument to be used.

Policy rules are created by combining together policy conditions using the Boolean operators AND, OR and NOT. Parentheses may be used to control the evaluation order. The user interface of the authentication and authorization system should provide a flexible mechanism to create policy conditions using the set of supported attributes and appropriate comparison operations, and then use Boolean operators to combine those policy conditions to create policy rules. Preferably, the precedence order when creating policy rules should be controlled to the user interface of the authentication and authorization system.

Internally, the set of operations needed to completely describe a policy rule are represented in an expression tree. An expression tree is a strict binary tree in which leaf nodes contain operands and non-leaf nodes contain operators. The root node contains the operator that is applied to the result of the left and right sub trees. In the authentication and authorization system of the present invention, a sub tree is used to describe the operators and operands for a single sub-expression as well as the Boolean operators needed to combine the results of evaluating sub-expressions and form the final policy rule result.

Policy rules may preferably have the form:

IF (policy condition 1) AND NOT
  (policy condition 2) AND
  ((policy condition 3) OR (policy condition 4))
THEN execute policy-action.

Note the parentheses controlling the operator precedents for the last sub-expression.

Exemplary comparison operations, as seen in the comparison operator enumeration object 72, are set forth as follows:

| Name | Notation | Relevant Data Types |
|---|---|---|
| Is True | Is True | Boolean |
| Is False | Is False | Boolean |
| Equal to | = | String, Integer, Enumeration, Date, Time |
| Not Equal To | != | String, Integer, Enumeration |
| Less Than | < | Integers, Date, Time |
| Greater Than | > | Integers, Date, Time |
| Less or Equal | <= | Integers, Date, Time |
| Greater or Equal | >= | Integers, Date, Time |
| Starts With | Starts With | String |
| Contains | Contains | String |
| Ends With | Ends With | String |
| Member Of | Member Of | Group (Multi-Valued) |
| Exists | Exists | Boolean |
| AND | AND | Boolean |
| OR | OR | Boolean |
| NOT | NOT | Boolean |
| ( ) | Precedence | Boolean |

String comparisons are case sensitive and are made using UTF8 character encodings. Any attributes that obtain their data from a source that uses other character encodings will first convert the data into a UTF8 representation. This allows all comparison operations to be made using UTF8 encoding. Comparisons of integers must support signed and unsigned forms of short integer, integer and long integer data types.

Multi-valued attributes consist of a list of value separated by the limiter, usually a comma. Two types of multi-valued attributes are supported, these are groups, which are inherently multi-valued, and multi-valued strings.

The only operator that is valid for attributes of the type group is the "member of" operator. This operator extracts each individual group from the multi-valued group attributes and compares it to the argument. It returns true if any individual value matches the value of the argument.

The valid operators for multi-valued strings are "equal to" and "not equal to". The "contains" operator, which functions in a similar way to the "member of" operator, extracts each individual string value from the multi-valued string and compares it to the argument. If returns true if any individual value matches the value of the argument.

Exemplary valid policy condition may be as follows:

IF (transaction.outer_tunnel.username = "Vendor Name")
IF (transaction.inner_tunnel.tunnel_type = Protocol Type
IF (authenticator.ip_address = "IP Address"
IF ((transaction.time >= time1) and (transaction.time <= time2))

Each instance of the authorization policy 22 is defined by its attributes as follows:

| Description | Data Type | Notes |
|---|---|---|
| Name | Medium String | Reserved |
| Policy Rule | Container of Policy Rules | Filled in by Software |

The method definitions and operations defined for each instance of the authorization policy 22 are as follows:

| Definition | Operation |
|---|---|
| AddRule( ) | Add Policy Rule |
| RemoveRule( ) | Remove Policy Rule |
| RetrieveRule( ) | Retrieve Policy Rules |

Each policy rule 68 is defined by its attributes as follows:

| Description | Data Type | Notes |
|---|---|---|
| Name | Short String | Required |
| Policy Condition Tree Root | Expression Node | Filled in by software |
| Policy Action | Enumeration | Required |
| Provisioning Policy | Provisioning Policy Reference | Optional |

The policy condition tree road attribute is an instance of an expression node 74. The expression node is that the rest of the expression tree. The policy action attribute is an enumeration with exemplary values of REJECT, ALLOW or ALLOW WITH PROVISIONING. The provisioning policy attributes a reference to the provisioning policy 24, which may be optional.

Each instance of the expression node 74 is defined by its attributes as follows:

| Description | Data Type | Notes |
|---|---|---|
| Attribute | Enumeration | Required |
| Comparison Operator | Enumeration | Required |
| Argument Type | Enumeration | Required |
| Argument Length | Short Integer | Filled in by software |
| Argument | Data (Octets) | Required |
| Boolean operator | Enumeration | Required |

Attribute of the policy expression node 74 specifies which attribute of the policy rule 68 to use. It is to be noted that this is the operand, the list of attributes as set forth herein below.

Comparison operator is an enumeration of the possible comparison operators of the comparison operator 72. This is the operator. Either this value or the Boolean operator is present, but not both.

Argument type specifies the data type of the argument. Valid values are, as seen in the argument type enumeration object 76, BOOLEAN, INTEGER, STRING, ENUMERATION, DATE, TIME or GROUP.

Argument length is the length of the argument in octets. Argument stores the argument value in octets. Boolean operator is present only if the policy expression node 74 refers to sub-expression.

Figure 1F:
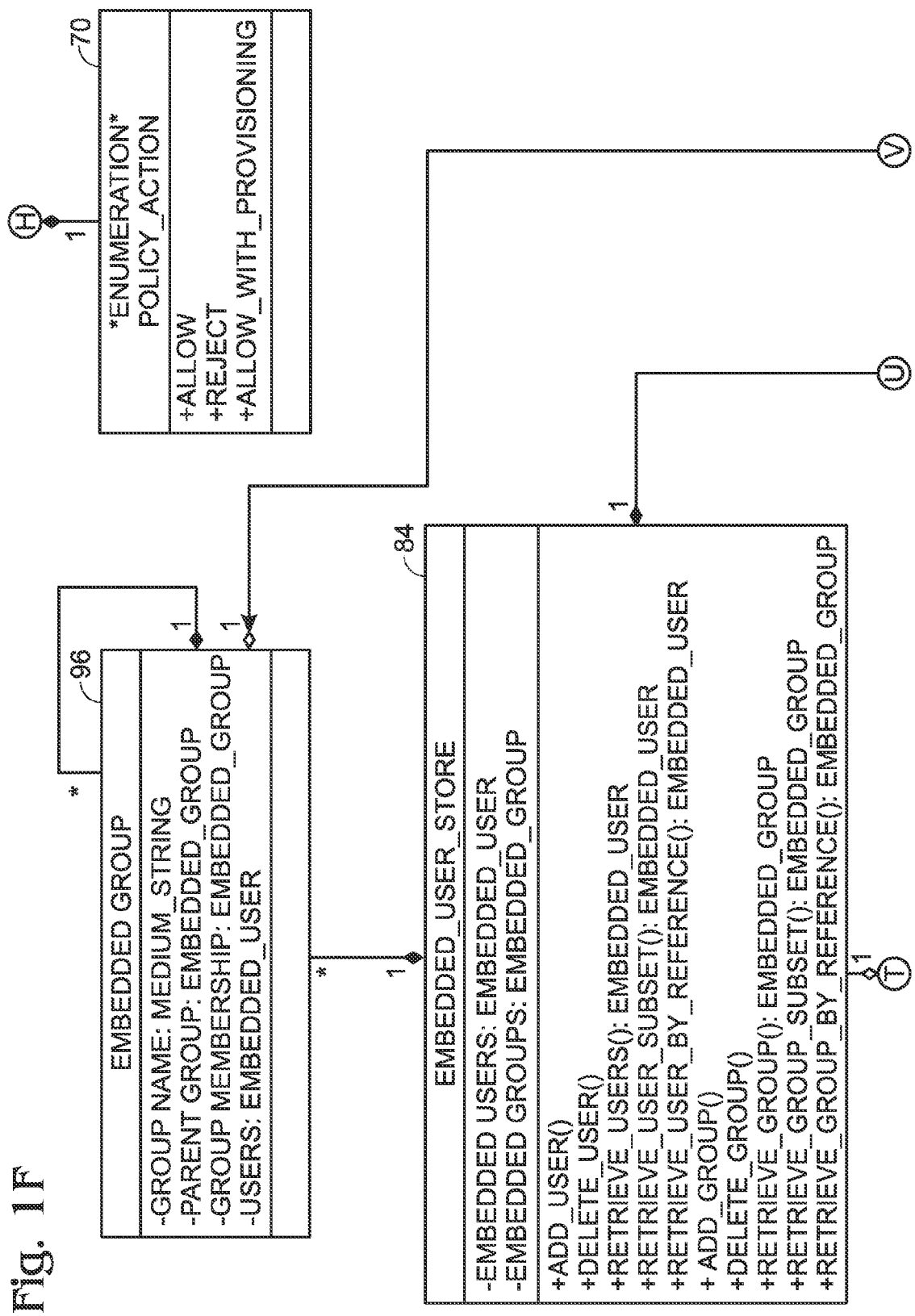
Figure 11:
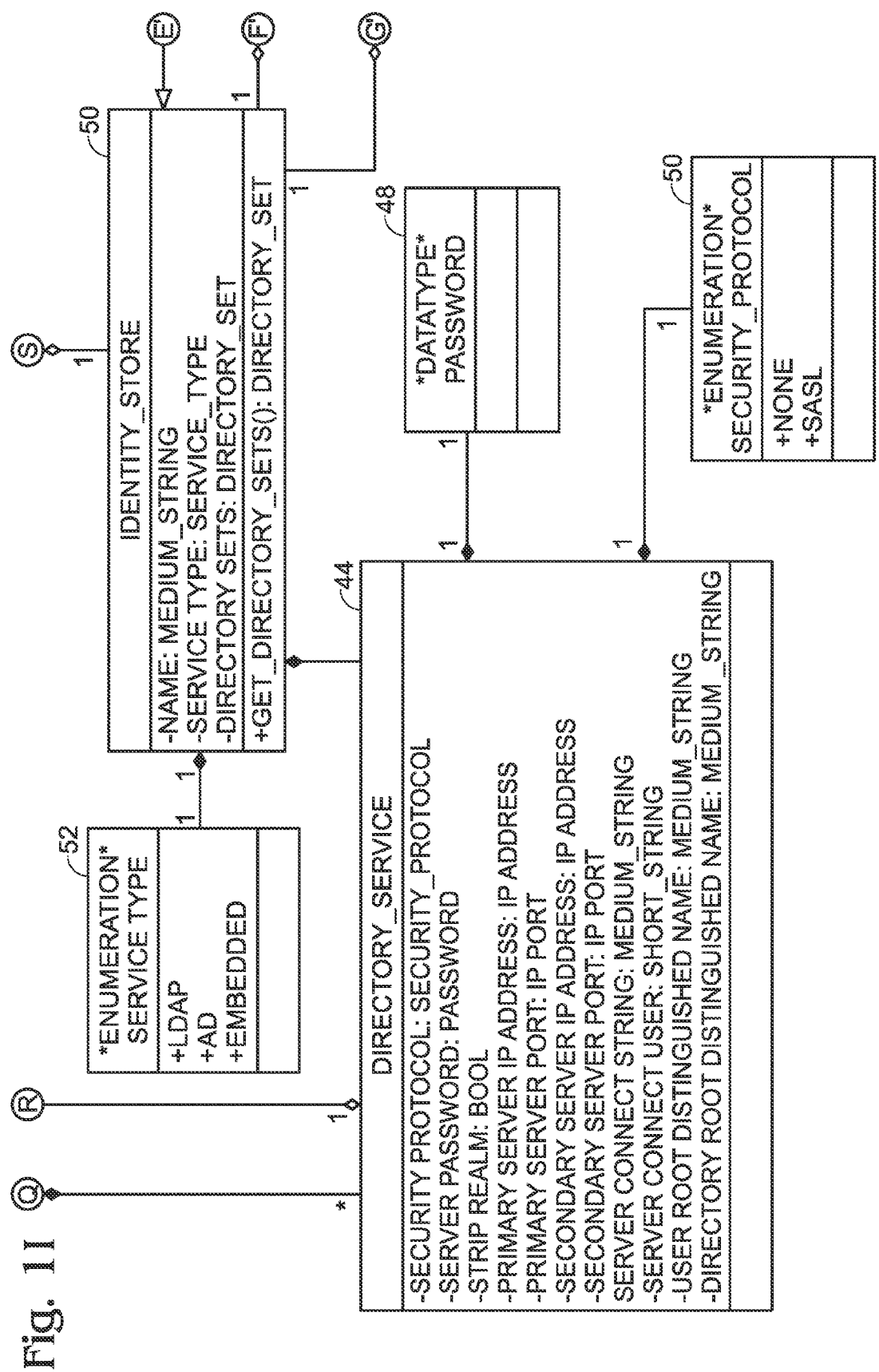

The policy action enumeration object 70 specifies the desired behavior or action to take if the policy condition Boolean expression evaluates to true. As seen in FIG. 1F, this is an enumeration with one of the values REJECT, ALLOW, or ALLOW WITH PROVISIONING. The corresponding allowed policy actions are as follows:

| | |
|---|---|
| REJECT | disallow network access |
| ALLOW | allow network access |
| ALLOW WITH PROVISIONING | allow network access and apply the provisioning policy. |

It is contemplated in the present invention that an alert can be generated for each policy action. An alert results in a message being sent to a log, and optionally to a SMTP mail server.

The provision policy 24 is a list of settings that are applied to the user session only if a user is authenticated and authorize successfully. Different settings are applied using different mechanisms. Some settings are applied by sending vendor-specific-attributes (VSA's) to the authenticator as part of the access-accept message, as described herein below. Other settings are also contemplated using SNMP or proprietary APIs provided by the authenticator. Exemplarily, the provisioning policy 24 may allow settings for VLAN assignment and user session timeout. other settings may include additional parameters, such as QoS assignment.

The provisioning policy 24 is defined by its attributes, as seen in FIG. 1G, as follows:

| Description | Data Type | Notes |
|---|---|---|
| Name | Median String | Reserved |
| VLAN Assignment | Short Unsigned Integer | Optional |
| User Session Timeout | Long Unsigned Integer | Optional |

A policy rule attribute container object 78, owned by the policy expression node 74, arranges available attributes into four categories, user attribute shown by a user attribute object 80, transaction attributes shown by a transaction attribute object 82 authenticator attributes shown by an authenticator attribute object 84, and system attributes. Each of the objects shown for these attributes is a container of attributes defined for that category.

The policy rule attribute container 78 is defined by its attributes as follows:

| Description | Data Type | Notes |
|---|---|---|
| Name | Medium String | Constant |
| Attributes List | Container of Attributes | Constant |

The user attributes for the user attribute container object 80 are available in the user record, which is obtained from either the backend directory server or a embedded user store 84, describing greater detail below, as part of the user authentication processing. Irrespective of the source of the user attribute data, the user attribute is mapped through an attribute mapping object 86 to a virtual attribute 88, each of which is also described in greater detail below, before it can be used inside authorization policy rules.

One important user attribute in the user record contains the user's group membership information, usually in a multi-valued attribute form. The "member of" operation described above allows the policy engine rule to explode the list of groups from the multi-valued attribute and evaluate whether the user is in member of a particular group.

Virtual group mapping is applied to the group names before they are used as part of policy evaluation. Additional attributes associated with user are the number of concurrent user sessions for this user and the total number of concurrent sessions for the entire management domain. The ability to maintain accurate counts of these two values depends on the capabilities of the authenticator.

Figure 1J:
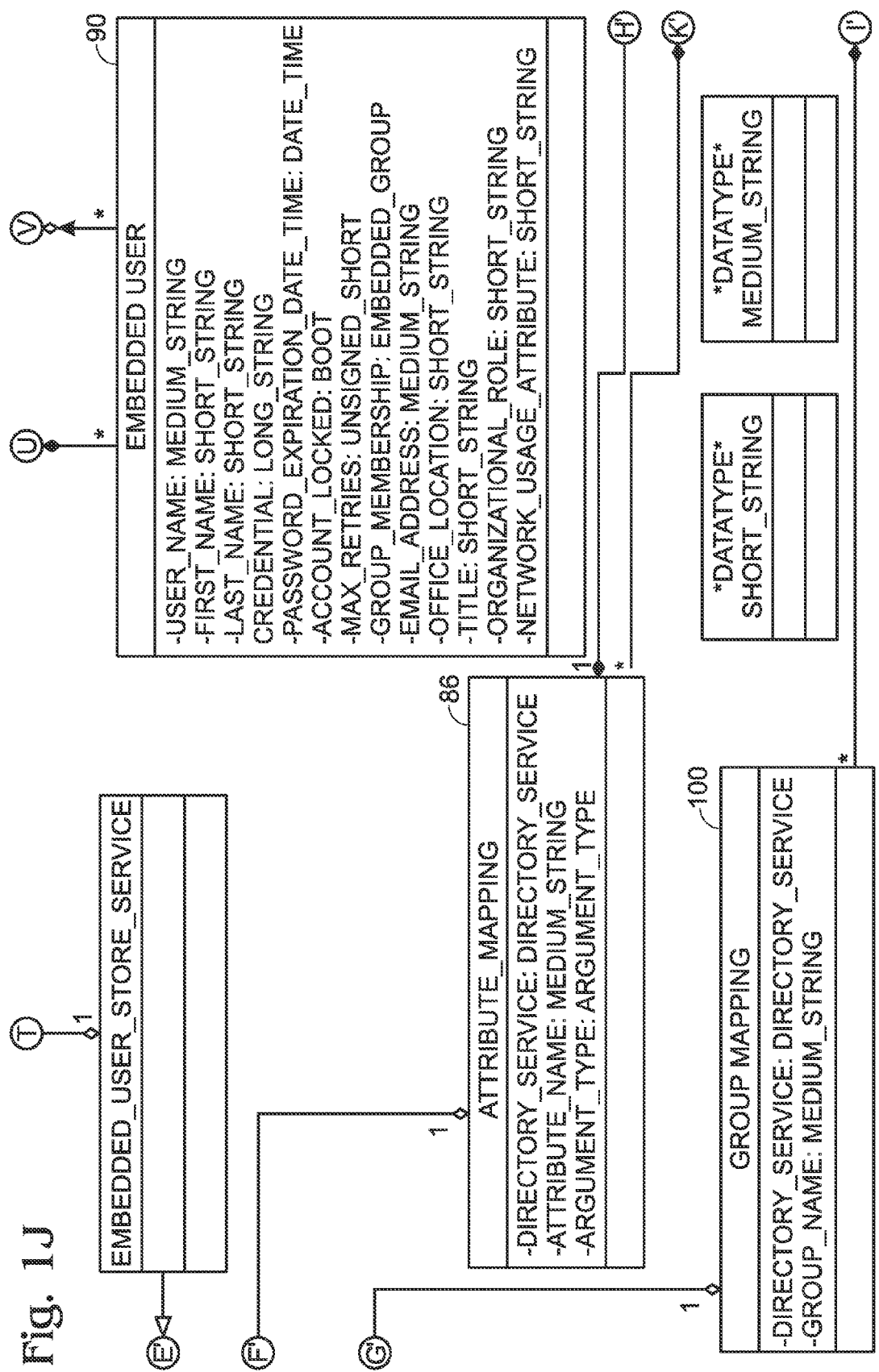

If the user record is obtained from the embedded user store 84, then all the attributes contained within the user record, shown in FIG. 1J as the embedded user object 90, are available for policy evaluation. All user attributes obtained from the embedded users store 84 are automatically mapped to the virtual attribute 88 when they are created. The attributes mapped from the embedded user object 90 are described set forth in the description of the embedded user store 84 and embedded user object 90 below.

The attributes of the transaction attribute object 82 describe a variety of information about the authentication and authorization transaction, allowing policy decisions to be made based in the user name or realm, the security level of the negotiated tunnel, the characteristics of this output and, and other similar information. some of these attributes are created from information carried in the RADIUS request. Other attributes are based information contained within other objects of the architecture 10. Exemplary attributes are:

| | |
|---|---|
| User Name (outer tunnel) | Medium String |
| Realm (outer tunnel) | Short String |
| Supplicant MAC Address | Short String |
| Realm (inner tunnel) | Short String |
| User Name (inner tunnel) | Medium String |
| Secure Tunnel Used | Boolean |
| Outer Tunnel Type | Enumeration |
|   PEAP | |
|   TTLS | |
| Inner Tunnel Type | Enumeration |
|   MSCHAPv2 | |
|   MD5 | |
| Directory Service Type | Enumeration |
|   LDAP | |
|   AD | |
| Authentication Results | Enumeration |
|   Authenticated | |
|   Not Authenticated | |
|   Unknown User | |
| Date | Date |
| Time | Time |
| Date and Time | DateTime |

Authenticator attributes of the authenticator attribute object 84 allow authorization policy rules that make decisions based information about the authenticator to be specified. For example, authorization policies can be built where different provisioning policies are applied based on the location of the authenticator when the type of network servers. The attributes of the authenticator attribute object 84 are:

| | |
|---|---|
| Authenticator Name | Short String |
| Authenticator Bundle Name | Short String |
| Authenticator MAC Address | Short String |
| Authenticator IP Address | Medium String |
| Authenticator Port | Integer |
| Device Type (from Authenticator) | Enumeration |
| Device Vendor | Enumeration |
| Device Model | Enumeration |
| Service Category Name | Medium String |
| Authenticator Hierarchy Node | Membership |

Note that the authenticator attribute object 84 has part of its aggregation an instance of the authenticator base 30.

Vendor specific attributes (VSAs) are used by network equipment manufacturers to expose custom capabilities of their equipment using the RADIUS protocol. VSAs build on the standard list of attributes defined as part of the radius specification. The VSAs for particular device, vendor or sometimes technology, for example, VOIP, are saved in the data file called the device description file.

Each device description is maintained within the device descriptor 34 and is associated with either a vendor, vendor/model or vendor/technology. The collection of device descriptions is the device dictionary 36.

Vendor specific attributes may be used when a particular provisioning policy of the policy rule 68 is applied to a particular user session, once that user has successfully authenticated. Some provisioning policies are applied using standard radius attributes and some are applied using VSAs. Additionally, is to be understood that not all authenticators will be fully RFC compliant and that some vendors may choose to use VSAs or other mechanisms to accept provisioning policy values. Accordingly, the mapping VSAs or other mechanisms to each type the provisioning policy supported by the authenticator is that shown in the architecture 10 of FIG. 1, but is within the concept of the present invention. Exemplarily, the standard RADIUS attributes are minimally supported by the architecture 10.

The authenticator vendor name and model number in the device descriptor 34 serve two purposes within authentication and authorization system of the present invention. The primary purpose is to allow the RADIUS protocol engine to locate the correct device description for the authenticator when the authentication and authorization system is processing the authentication and authorization request. The secondary purposes to allow authorization policy rules that use the authenticator model and vendor attributes to be defined.

Device descriptions may be contained in a device vendor enumeration object 92 and also in a device model enumeration object 94, as seen in FIG. 1. The device under enumeration object 92 and the device model enumeration object 94 provided data for the vendor and model attributes, respectively, of the device descriptor 34.

The device dictionary 36 is used for managing the device descriptions of the device descriptor 34. It is contemplated within the present invention that device descriptions may be selectively defined or added to the device dictionary 36, or hard coded into the architecture 10.

The device dictionary 36 is a singleton object consisting of an associated container of device descriptions 34. The device dictionary 36 allows each entry in the device descriptor to be indexed by its vendor and model enumeration values contained in the device vendor enumeration object 92 and the device model enumeration 94.

The method definitions and operations defined for the device dictionary 36 are as follows:

| Definition | Operation |
|---|---|
| AddDeviceDescriptor( ) | Add a new device description |
| RemoveDeviceDescriptor( ) | Remove an existing device description |
| RetrieveByVendorandModel( ) | Retrieve a device description based on vendor and model. |

The authentication and authorization system may use the existing device dictionary file format provided with the open source free RADIUS product, which are subject to the GNU public license restriction. Alternatively, other file formats may be used.

Each file in the device dictionary 36 may provide support for an individual model of equipment, for family for equipment from a particular vendor, or family of equipment that provides similar functionality, for example VOIP solutions. Information describing the range of supported equipment may be preferably encoded into the name of the device description file and will also exist within the file. The version of each device description file may also be provided so that updates to individual files can be tracked.

The authentication authorization system of the present invention is configurable to retrieve the user record information from external directories and databases. It also allows user records to be defined and saved in the system database. The concept in the architecture 10 that enables this functionality is the embedded user store 84 introduced above. The embedded user store 84 enables users to be added to the authentication and authorization system by creating user records. The embedded users store also enables group hierarchies to be created in managed and also to associate users with those groups.

One exemplary use of the embedded users store 84 obviates the need to connect to an external Active Directory or LDAP store. The number of user records that may be stored is unlimited.

The embedded user store 84 owns multiple instances of an embedded group object 96. The embedded group object 96 allows groups to be created, managed and organized within the embedded users store 84. A user group contained within the embedded group object 96 may contain users and other user groups, and allows nesting of user groups to be supported.

The embedded group object 96 may also contain a default user group to allow users to be added to the system for various purposes, such as valuation and demonstration. This default user group may initially been named "default," but may be renamed. A respective of whether the default user group has been renamed, the default group may not be deleted. Accordingly, the default user group is identified by its using its reference key and not its name.

An embedded user group is defined by the attributes of the embedded group object 96 as follows:

| Description | Data Type | Notes |
|---|---|---|
| Group Name | Medium String | Required |
| Parent Group | Reference to Group | Filled in by software |
| Group Membership | Container of references | Filled in by software |
| User Membership | Container of references | Filled in by software. |

Operations supported by the embedded group object 96 include:
1. Adding new group.
2. Edit an existing group.
3. Remove an existing group 4. Retrieve all existing groups
5. Retrieve assorted list of groups
6. Retrieve all users for group
7. Retrieve all child groups for group
8. Add a user to a group
9. Add a group to a group.

As stated above, authorization policy rules of the policy rule object 68 operate on virtual groups and not on the actual groups that exist within the directory service or database. The same constraint applies for groups that are created within the embedded user store 84. Groups from the embedded user 84 store are mapped to a corresponding virtual group 98, described below, before they can be used for authorization policy rule evaluation. The authentication and authorization system creates a virtual group 98 automatically, thereby obviating the need to manually create a virtual group 98 for every embedded user group within the embedded users toward 84.

The embedded user store 84, by owning the user records corresponding to each instance of the embedded user object 90, allows custom user attributes of different data types to be defined and list of those attributes to be created. Each user record contained in the embedded users store 84 contains the following fields of the embedded user object 90 as follows:

| Description | Data Type | Notes |
| --- | --- | --- |
| User Name | Medium String | required |
| First Name | Short String | required |
| Last Name | Short String | required |
| Credential | Medium String | required |
| Credential Type | Enumeration | required |
| Password expiration date and time | Time | optional |
| Account Locked Status | Boolean | optional |
| Max Retries | Short unsigned integer | optional |
| Group Membership | Container of references | required |
| Email Address | Medium String | optional |
| Office Location | Short String | optional |
| Title | Short String | optional |
| Organizational Role | Short String | optional |
| Network Usage Attribute | Short String | optional |

The following operations are supported for managing user records in the embedded users store 84:
1. Add a new user record
2. Edit an existing user record
3. Delete an existing user record
4. Retrieve all user records
5. Retrieve a subset of all existing user records
6. Retrieve a sorted list of existing user records
7. Support paging through a large numbers of user records.

The present convention contemplates that protocols that support the password change capability, such asMSCHAPv2, may provide this functionality against passwords from the embedded user store 84. However, the pass for change capability is not required for practicing the present invention.

Discussed above, is the concept of virtual group mapping. A virtual group mapping object 100 allows virtual groups within authentication and authorization system to be created and further allows the virtual group 98 to be associated with groups defined within one or more backend databases or directories and within the embedded user store 84. This capability allows policies to be authored that operate on group information, regardless of which database or directory was used to provide the user information record.

For example, in an LDAP directory to contractor group might be named "contractor," while in an active directory store contractors might be members of the group named "DL-contractors." By mapping both of these groups to the local virtual group 98 with the attributed name set to "contractors," the policy rules can be written in a database agnostic manner.

The Virtual group 98 may be used when evaluating policy conditions within the authorization policy rules. This creates a dependency between policy rules and virtual groups and a virtual group may not be deleted if it is being used inside an authorization policy rule. The database layer of the authentication authorization system will use constraint checking to discover whether a virtual group is being used within a policy rule and prevent the virtual group from being deleted if it is being used by a policy rule.

To avoid errors at policy evaluation time, the user interface preferably allows the complete list of groups available within a directory service to be seen so that groups to be associated with a virtual group may be selected. It should be noted that this operation involves interaction with a backend database or directory.

As seen in FIG. 1, a single instance of the virtual group 98 may be mapped to the group mapping object 100 to multiple groups within a single directory service, database or the embedded users toward 84. An instance of the virtual group 98 is defined by

| Description | Data Type | Notes |
| --- | --- | --- |
| Group Name | Median String | Required |
| Mapped Groups | Container of Group Mappings | Required. |

An individual group mapping object 100 defined by:

| Description | Data Type | Notes |
| --- | --- | --- |
| Directory Service | Reference to a Directory Service | Required |
| Group Name | Median String | Required. |

A virtual group manager 102 is a single instance of a container that owns each virtual group 98. The operations to support by the virtual group manager 102 are:
1. Create a new virtual group
2. Delete a virtual group
3. Edit an existing virtual group
4. Retrieve a list of all existing virtual groups
5. Retrieve a list of available groups or directory store.

Virtual attribute mapping object 86 allows attributes from different sources that represent the same information to be used in a consistent manner inside policy definitions. The virtual attribute mapping feature is referred because identity routing allows user records to be fetched from different databases and directors. Virtual attributes from the virtual attribute object 88 can also be used when user records are retrieved from the embedded user store 84 through the identity store 50.

Virtual attribute mapping may be used to author policies that operate on user attributes regardless of the attribute name and data type defined in any particular user data store. For example, in an LDAP directory the job title attribute might be named "title," while an active directory store it might be named "job title." By mapping both of these attributes to a virtual attribute named "title" in the virtual attribute object 88 policy rules can be written a database agnostic manner.

Virtual attributes from the virtual attribute object 88 are used when evaluating policy conditions within the authorization policy rules. This creates a dependency between policy rules and virtual attributes. Accordingly, a virtual attribute that is being used inside and authorization policy rule should preferably not be deleted. The authentication authorization system database layer will use constrain checking to discover whether a virtual attribute is being used within a policy rule and use that information to prevent the virtual attribute from being deleted if it is being used within a policy rule.

A virtual attribute object 88 is defined by its attributes as follows:

| Description | Data Type | Notes |
| --- | --- | --- |
| Virtual Attribute Name | Medium String | Required |
| Mapped Attributes | Container of Attribute Mappings | Required |
| Data Type | Enumeration | Required |

The date type enumeration specifies the data type of the mapped attribute. Valid values are STRING, MULTI-VALUED STRING, INTEGER, BOOLEAN, DATE or TIME.

An individual to attribute mapping object 86 is defined by:

| Description | Data Type | Notes |
| --- | --- | --- |
| Directory Service | Reference to a Directory Service | Required |
| Attribute Name | Medium String | Required |
| Data Type | Enumeration | Reserved |

The data type enumeration specifies the data type of the attribute. Valid values are STRING, MULTI-VALUED STRING, INTEGER, BOOLEAN, DATE or TIME.

The user interface operations needed to support the virtual attribute object 88 are:

1. Creating new virtual attributes
2. Retrieve a list of existing virtual attributes
3. Edit an existing virtual attribute
4. Delete an existing virtual attribute.

Once a virtual attribute 88 has been created its data type or multi-valued property should not be changed. Preferably, the virtual attribute 88 should be deleted and then re-created with the desired properties. The data type and multi-valued properties of the virtual attribute 88 also match the data type and multi-valued properties of any attribute mappings that are mapped to it. As contemplated that control over the data type and multi-valued properties of the attribute mappings is allowed by the system of the present invention. however, is preferred that attributes are selected from a list of attributes that exactly match the data type and multi-valued properties of the virtual attribute.

In the authentication and authorization system of the present invention, the RADIUS service can be started without changing any of the default values for any of the RADIUS configuration parameters. In this case the RADIUS service will listen on UDP port 1812 for authentication and that port 1813 for accounting. Older RADIUS systems use ports 1645 and 1646 for these services and these values may also be supported. The radius service is always bound to the IP address specified for the administration port of the authentication and authorization system. The graphic user interface preferably provides a page where the radius service parameters may be configured.

The radius configuration is defined by:

| Description | Data Type | Notes |
| --- | --- | --- |
| Authentication Port | IP Port | Required Default to 1812 |
| Accounting Port | IP Port | Required Default to 1813 |
| Retransmission Timeout | Unsigned Short Integer | Required Default to 5 |
| Maximum Requests/Second Limit | Unsigned Integer | Required Default to 1000. |

IP port values lie between 1024 and 65535.

The retransmission timeout specifies the time in seconds between RADIUS packet retransmission if the authentication and authorization system fails to receive a response from the authenticator.

The Maximum Request/Second Limit field allows the maximum number of RADIUS requests per second that may be handle from a single node to be limited. This limitation may provide some defense against denial of service attacks caused by rogue authenticators flooding authentication and authorization system with RADIUS transactions.

The authentication and authorization system of the present invention may, but need not, act as a RADIUS proxy and forward RADIUS request to another RADIUS server. However, the system may handle RADIUS request forwarded to it from another RADIUS server.

Referring now to FIG. 2, there is shown a flowchart 110 of the RADIUS transaction processing performed by the authentication authorization system of the present invention. As indicated that 112, the process is initiated upon the authentication and authorization system receiving a RADIUS packet. A determination is made, as indicated that 114, whether the protocol packet rate has been exceeded. If the determination is YES, then the packet is discarded, as indicated at 116. Additionally, statistics may be logged or alerts sent as to the action taken. In any event, the process is terminated, as indicated at 118.

Otherwise, if the determination is NO, a determination is made, as indicated at 120, whether a static AP entry exists. If the determination is NO, a subsequent determination is made, as indicated at 122, whether a dynamic authentication protocol (AP) entry exists. If the subsequent determination is NO, a shared secret and IP wild-card lookup is performed, as indicated at 124, and a further determination made, as indicated at 126, whether an authenticator service category bundle has been identified. As described above, a bundle may be used when authenticators on the network are trusted. If this further determination is also NO, then the packet is discarded, as indicated at 116, and the process terminated, as indicated at 118.

Otherwise, is the determination made at 126 is YES, a dynamic AP entry is created, as indicated at 128. Whether the dynamic AP entry was created as indicated at 128, or the dynamic AP entry has already been determined to exist, from the determination made at 122, a determination is made, as indicated at 130, whether such dynamic AP entry is valid. If NO, then the dynamic AP entry is deleted, as indicated at 132. An alert may be generated, as indicated 134, and processing returned to creating another dynamic AP entry, as indicated at 128.

If the determination made at 130 is YES, then a determination is made whether the current transaction is a valid RADIUS transaction, as indicated at 134. If NO, then the packet is discarded, as indicated at 116, and the process terminated, as indicated at 118. Otherwise, if YES, the determinations made whether the received packet is a radius ping packet. If YES, access to the authentication and authorization system is denied, as indicated at 138 in the event may further belonged as indicated at 140. Again, the packet is discarded, as indicated at 116, and the process terminated, as indicated at 118.

If the determination made at 136 is NO, a determination is made whether the AP packet rate is exceeded, as indicated at 142, to protect against denial of service attacks. If the determination made at 142 is YES, then the packet is discarded, as indicated at 116, and the process terminated, as indicated at 118. Otherwise, processing continues to the session handling, as indicated at 144.

Figure 3:
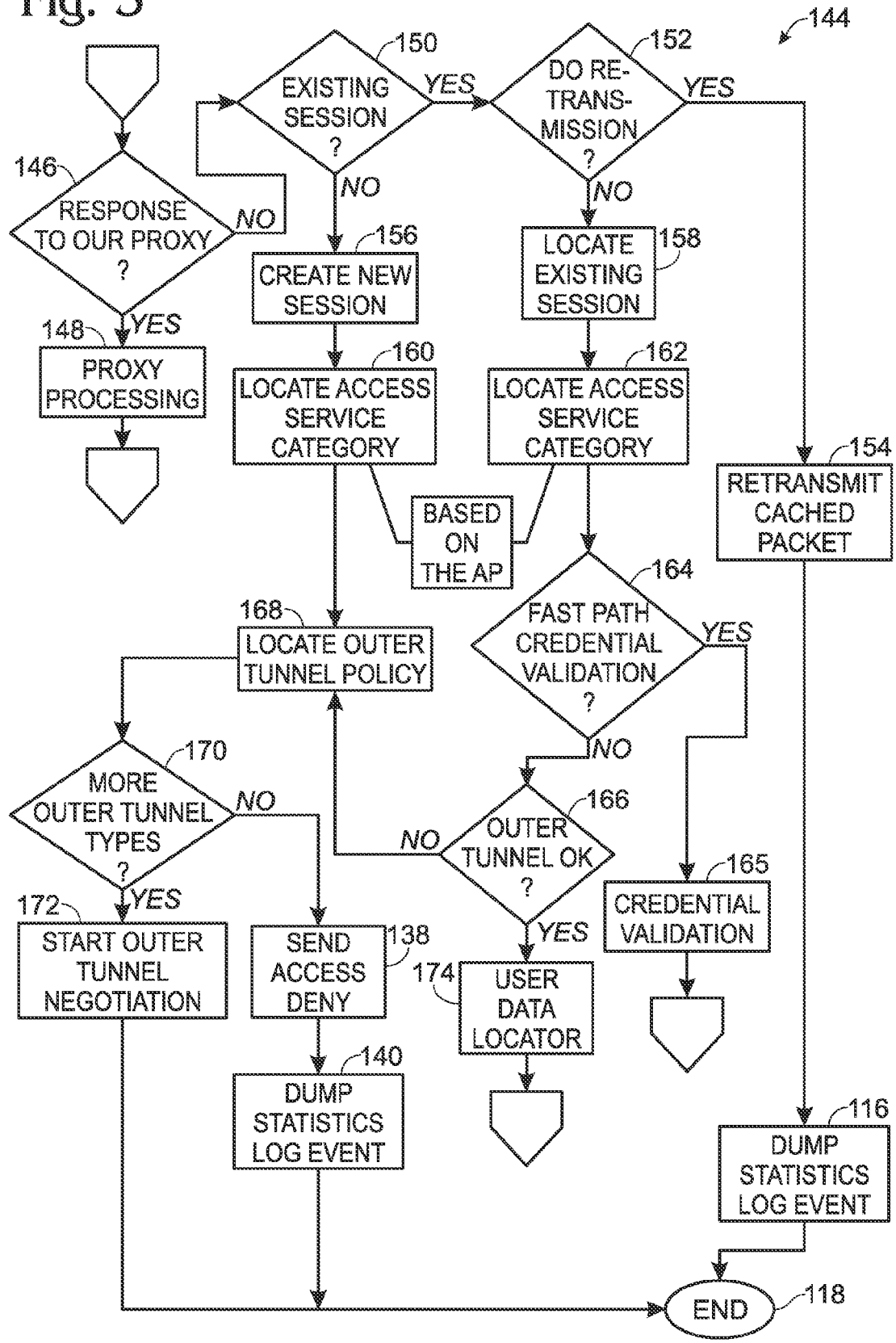
FIG. 3 is a flowchart of a session handling process performed by the authentication and authorization system at present invention.

Referring now to FIG. 3, there is shown a detail of the session handling 144 of FIG. 2. After the negative determination is made at 142 (FIG. 2), a determination is made, as indicated at 146, whether the received RADIUS packet is in response to a proxy. If YES, proxy processing is performed as indicated at 148.

Otherwise, if the determination indicated at 146 is NO, a determination is made, as indicated at 150, whether the current session is an existing session. If YES, a determination is made, as indicated at 152, whether a cached packet is to be retransmitted. If YES, the cached packet is retransmitted as indicated at 154, and the event is logged, as indicated at 140, and the session ended, as indicated at 118, as described above.

If the determination made at 150 is NO, a new session is created, as indicated at 156. Similarly, if the decision made at 152 is NO, the existing session is located, as indicated at 158, this being a resumption of an existing session. In either event, the service category is located, as indicated at 160 or at 162, respectively. The service category is located based on the authentication protocol.

With respect to an existing session, a determination is made, as indicated at 164 whether fast path credential validation is to be performed. If YES, credential validation is performed, as indicated that 165. Otherwise, a determination is made, as indicated at 166, whether the outer tunnel is OK. If NO, the outer tunnel policy is located, as indicated at 168. With respect to a new session created at 156, the outer tunnel policy is located, at 168, after the service category is located at 160.

A determination is made, as indicated at 170, whether more outer tunnel types exists. If NO, access to the network is denied, as indicated at 138, the event logged, as indicated at 140, and the session ends, as indicated that 118. Otherwise, if the determination made at 170 is YES, the outer tunnel negotiation is initiated, as indicated at 172. After the outer tunnel is negotiated, the session ends, as indicated at 118 Alternatively, the session may continue with identity routing.

Returning to the determination made at 166, if YES, identity routing is performed, as indicated at 174. The identity routing is a user data locator process performed by the authentication and authorization system.

Figure 4:
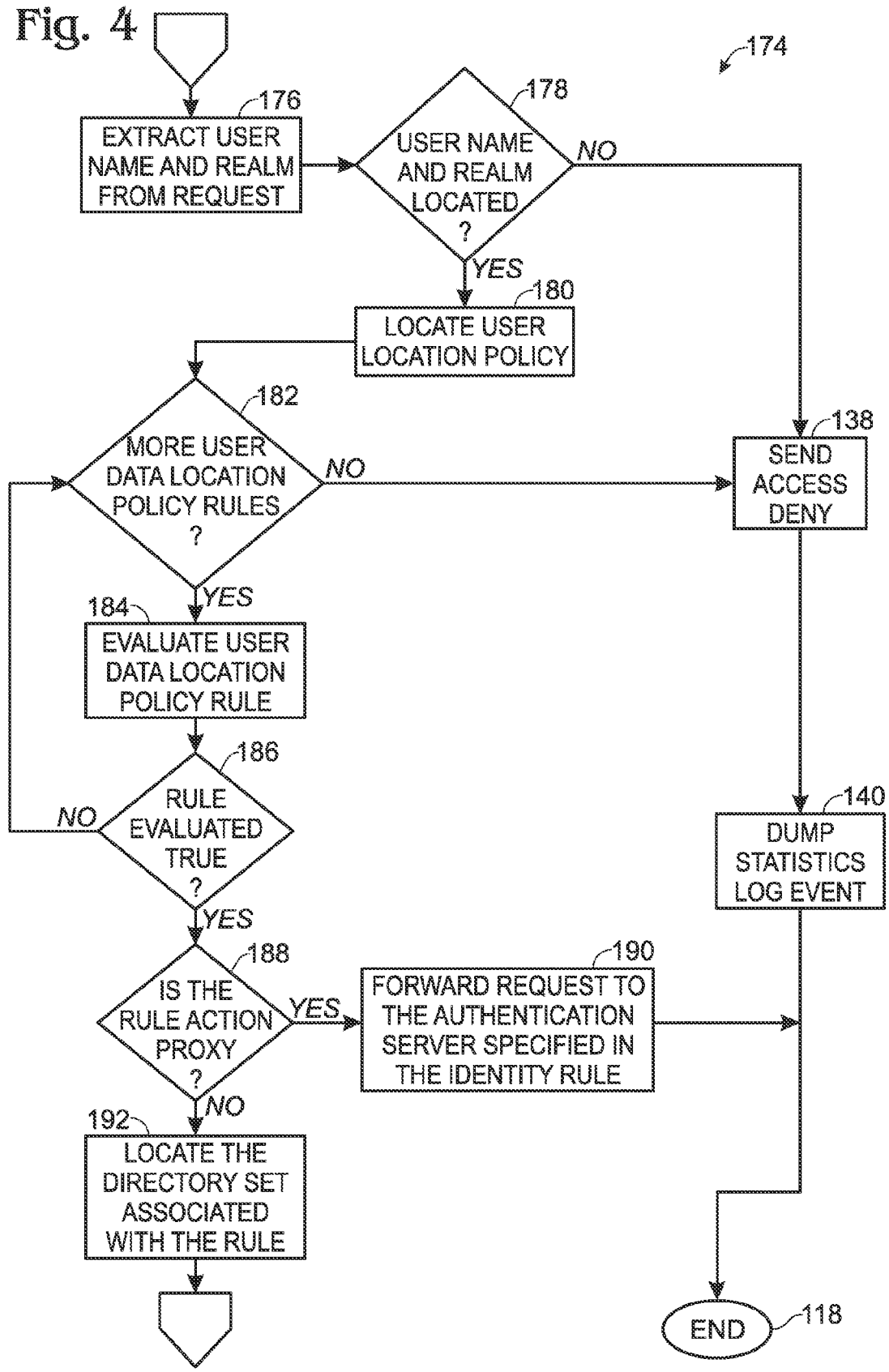
FIG. 4 is a flowchart of the user data locator process performed by the authentication and authorization system of the present invention.

With reference now to FIG. 4, there is shown a detail of the user data locator process 174. As indicated at 176, the username and realm is extracted from the request. A decision is made, as indicated at 178 whether the username and realm have been located. If NO, access is denied, as indicated at 138, the event logged as indicated at 140, and the session terminated as indicated that 118.

Otherwise, if the determination made at 178 is YES, the user location policy is located, as indicated at 180. At this step in the identity routing, a mapping is made between realm names and the identity store. After the user location policy is located, a determination is made, as indicated at 182, whether more user data location policy rules exist.

If YES, the user data location policy rule is evaluated as indicated at 184, and the policy rule is evaluated, as indicated at 186, to see if it is true. If NO, processing returns to the determination at 182 to determine again if there are more rules. If NO, that is there are no more rules, accesses denied, as indicated at 138, the event logged as indicated at 140, and the session terminated as indicated that 118.

Otherwise, if the policy rule is determined as true, at 186, the YES path is taken and a determination is made, as indicated at 188, whether the rule action is a proxy. If YES, the request is forwarded to the authentication server specified in the identity rule, as indicated at 190. The session then ends as indicated at 118.

If the determination made at 188 is NO, the directory set associated with the rule is located, as indicated that 192. The directory set, as described above, is a list of servers.

Figure 5:
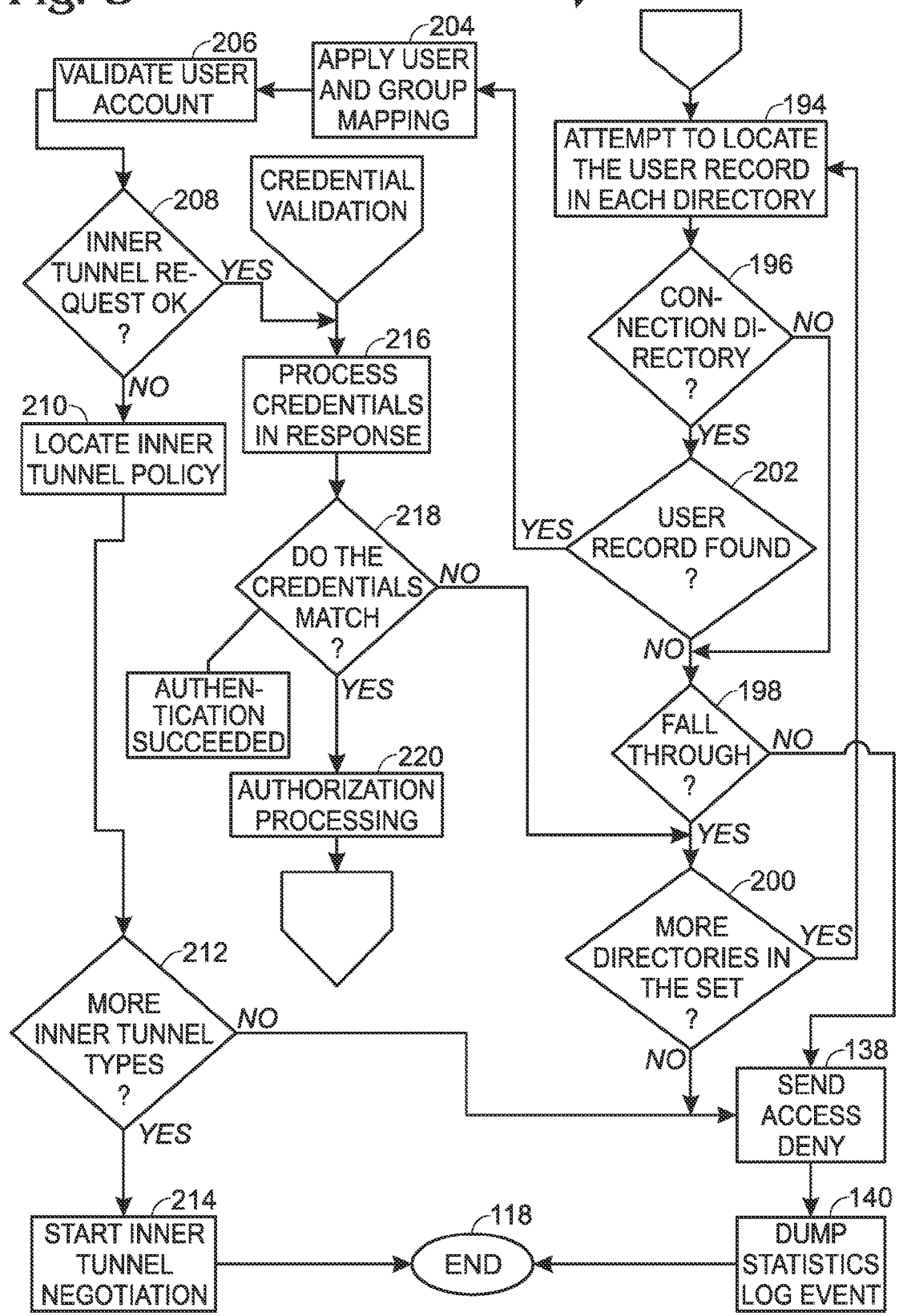
FIG. 5 is a flowchart of the directory set negotiation performed by the authentication and authorization system of the present invention.

Referring now to FIG. 5, there is shown a detail of the directory set negotiation 192. As indicated at 194, an attempt is made to locate the user record in each directory set. A determination is made, as indicated at 196, whether a connection has been made to a directory set. If NO, a determination is made, as indicated at 198, whether a fall through condition as hereinabove described exists. If there is no fall through condition, the NO path is taken, wherein access is denied, as indicated at 138, the event logged as indicated at 140, and the session terminated as indicated at 118.

Otherwise, if a fall through condition does exist, as determined at 198, the YES path is taken so that a decision is then made, as indicated at 200, whether there are more directories in the set. If YES, processing returns to the location of the user record in each directory, as indicated at 194. If NO, accesses denied, as indicated at 138, the event logged as indicated at 140, and the session terminated as indicated that 118.

If the determination at 196 indicates that a directory has been connected to, the YES path is taken such that the determination is made, as indicated at 202, whether the user record is found. If NO, processing returns to the determination made at 198, as described above. If the user record is found, the YES path is taken and user and group mapping is applied, as indicated at 204.

As indicated at 206, the user account is validated. The determination is then made, as indicated at 208, whether the inner tunnel request is OK. If NO, the inner tunnel policy is located, as indicated at 210. A decision is then made, as indicated at 212, whether there are more inner tunnel types. If NO, accesses denied, as indicated at 138, the event logged as indicated at 140, and the session terminated as indicated that 118. Otherwise, if YES, inner tunnel negotiation is started, as indicated at 214, after which process exits, as indicated at 118. Alternatively, the process may continue to credential validation.

Returning to the determination made at 208, if the inner tunnel request is OK, the YES path is taken and credential validation, also indicated that 165 (FIG. 3), commences. As indicated at 216, the credentials in the response are processed. A determination is then made, as indicated that 218, whether the credentials match. If NO, processing returns to the determination at 200, as described above. Otherwise, if YES, authentication has succeeded and authorization processing is commenced, as indicated at 220.

Referring now to FIG. 6, there is shown a detail of the authorization processing, indicated at 220. As indicated at 222, the authorization policy is located. The rule under the authorization policy is evaluated as indicated at 224. It is to be noted that there is always one rule under an authorization policy.

As indicated at 226, a determination is made whether the rule evaluates as true. If NO, access is denied, as indicated at 138, and the session is terminated as indicated at 118. If YES, the determination is made, as indicated at 228, if there are more rules. If there are more rules, the YES path is taken and processing returns to the rule evaluation, indicated at 224.

If there are no more rules and the rules evaluation is true, authorization has succeeded. In such event, the NO path is taken from the determination made at 228 and the provisioning policy is located, as indicated at 230. The provisioning policy is applied as indicated at 232.

As indicated at 234, an access allowed packet is sent, thereby allowing the user access to the network. The event may then be logged, as indicated at 236, and processing of the authentication and authorization system exits, as indicated at 118.

Returning to FIG. 1, the architecture 10 includes internal objects used to exchange information between the graphical user interface of the authentication and authorization system and its implementing software constructed in accordance with the architecture 10. These objects are not stored in the database, the schema objects and schema of which are attached as appendices hereto. The internal objects include a tunnel type object and a password object.

The tunnel type objects include:
Display Name (Short String)
Type ID (Enumeration)
  PEAP
  TTLS
  TLS
  MD5
Credential Type (Enumeration)
  PASSWORD
  CERTIFICATE
  Password (Medium String)
  Certificate (Certificate Wrapper).
The password objects include:
Password (Medium String)
Display/Hide (Boolean).

Also is seen in FIG. 1, starting internal data types of the architecture 10. The internal data types include:

| | |
|---|---|
| Short String | a string type with a maximum length of 32 characters |
| Median String | a string type with maximum length of 128 characters |
| Long String | a string type with a maximum length of 2048 characters |
| IPv4 Address | a 32-bit unsigned integer |
| IPv6 Address | an array of eight octets |
| IP Address | a union of an Ipv4 Address and an Ipv6 Address |
| IP Port | a unsigned 16 bits short integer |
| Date | a unsigned 32-bit integer |
| Time | a unsigned 32-bit long integer |
| Password | a MD5 hash of the password. |

There has been described hereinabove novel apparatus and methods for segmented network identity management. Those skilled in the art may now made numerous uses of, and departures from, the above described embodiment without departing from the inventive concepts described herein.

APPENDIX A

Database Schema Objects

Service Category Container
Unique object key
Service Categories (Collection of service categories)
Service Category
Unique object key
Name (Medium String)
Authenticators (Collection of authenticators)
Authenticator Bundles (Collection of authenticator bundles)
Tunnel Policy (Reference Key to a Tunnel Policy)
Identity Protocol Policy (Reference Key)
Authorization Policy C
Authenticator
Unique object key
Name (Medium String)
Service Category V
IP Address (Medium String)
Device Type (Enumeration)
Device Vendor Name (Enumeration)
Device Model (Enumeration)
Shared Secret (Password)
Member of (Collection—These are authenticator groups)
Authenticator Bundle
Unique object key
Name (Medium String)
Service Category V
IP Address Range or IP Address/network mask (Medium String)
Device Vendor Name (Enumeration)
Device Model (Enumeration)
Shared Secret (Password)
Member of (Collection—These are authenticator groups)
Authenticator Hierarchy Node
Unique object key
Name (Medium String)
Parent Node (Reference Key)
Child Nodes (Collection of reference keys)
Authenticators (Collection of reference keys)
Authenticator Bundles (Collection of reference keys)
Embedded User
Unique object key
Name (Medium String)
First Name (Short String)
Last Name (Short String)
Credential (Long String)
Credential Type (Enumeration)
Password expiration time (Long unsigned integer)
Max retries (Short unsigned integer)
Account locked (Boolean)
Member of (Collection of Reference Keys for local groups)
Email Address (Medium string)
Office Location (Short String)
Title (Short String)
Organizational Role (Short String)
Network Usage Attributed (Short String)
NT-Hash (16 bytes)
NT-Hash-Hash (16 bytes)
Embedded Group
Unique object key
Name (Medium String)
Parent Group (Reference Key)
Group Membership (Collection of Reference Keys to Groups)
Users (Collection of Reference Keys Too Embedded Users)
Virtual Group
Unique object key
Name (Medium String)
Mapped Groups (Collection of Group Mappings)
Group Mapping
Unique object key
Directory Service (Reference Key)
Group Name (Medium String)
Group DN (Medium String) DN of the back end group Virtual Attributed
Unique object key
Virtual Attribute Name (Medium String)
Mapped Attributes (Collection of Attribute Mapping
Mapped Attribute
Unique object key
Attribute Name (Medium String)
Data Type (Enumeration)
Attribute DN (Medium String)
Directory Service
Unique object key
Name (Medium String)
Service Type (Enumeration)
Security Protocol (Enumeration)
Credential (Binary)
Strip Realm (Boolean)
Primary Server IP Address or FQDN (Median String)
Primary Server Port (IP Port)
Secondary Server IP Address or FQDN (Median String)
Secondary Server Port (IP Port)
Server Connect String (Median String)
Server Connect User (Short String)
Server Root DN (Medium String)
Server Directory Root DN (Medium String)
Database Service
Unique object key
Name (Medium String)
Service Type (Enumeration)
Security Protocol (Enumeration)
Connect User (Short String)
Connect Credential (Binary)
Connect String (Median String)
Server IP Address or FQDN (Median String)
Server Port (IP Port)
Schema (Median String)
Directory Set
Unique object key
Name (Medium String)
Directory Services (Collection of Directory Service Entries)
Directory Service Entry
Unique object key
Directory Service (Reference)
Fall through if Not Available (Boolean)
Fall through if User Not Found (Boolean)
Fall through if Bad Password (Boolean)
Certificate Wrapper
Unique object key
Name (Short String)
Filename—name of the certificate file (Medium String)
Tunnel Type
Name (Short String)
Type ID (Enumeration)
Credential Type (Enumeration)
Password (Medium String)
Certificate (Certificate Wrapper Reference)
Cipher Suite—For PEAP only (Container of Medium Strings)
Tunnel Policy
Unique object key
Name (Medium String)
Tunnel Types (Collection of Tunnel Types)
Realm-to-Director Set
Unique object key
Realm (Medium String)
Authenticator Hierarchy (Authenticator Group reference)
Directory Set (Directory Set reference)
Realm-to-Proxy
Unique object key
Realm (Medium String)
Authenticator Hierarchy (Authenticator Group reference)
Proxy Server IP Address (Medium String)
Identity Routing Policy
Unique object key
Name (Medium String)
Realm-to-Directory Set list (Container of Realm-to-Directory Set)
Realm-to-Proxy list (Container of Realm-to-Proxy)
Credential Validation Policy
Unique object key
Name (Short String)
Inner Tunnel Types (Container of Tunnel Types)
Authorization Policy
Unique object key
Name (Medium String)
Policy Rules (Container of Policy Rules)
Policy Rule
Unique object key
Name (Short String)
Policy Condition (Expression Node)
Policy Action (Enumeration)
Send Alert (Boolean)
Provisioning Policy (Reference)
Expression Node
Unique object key
Attribute (Enumeration)
Comparison Operator (Enumeration)
Argument Type (Enumeration)
Argument Length (Unsigned short integer)
Argument (Octets)
Boolean Operator (Enumeration)
Provisioning Policy
Unique object key
Name (Medium String)
VLAN number (Short unsigned integer)
User Session Timeout (Long unsigned integer)
Proxy Policy
Accounting Logs
Status-Type (Enumeration)
Delay-Time (Integer)
Input-Octets (Integer)
Output-Octets (Integer)
Session-ID (Short String)
Authentic (Enumeration)
Session-Time (Integer)
Input-Packets (Integer)
Output-Packets (Integer)
Terminate-Cause (Enumeration)
Multi-Session-ID (Short String)
RADIUS Attributes (Collection of radius attributes)

APPENDIX B

Database Schema

Section 1 lists all the tables, their columns and types and the referential integrity constraints and any unique constraints maintained by the ZDB server. Section 2 describes the format of the CSV files needed to load up the database tables.

Section 1:

The tables, their column definitions and the constraints are as follows:

1. UserConfig—The table for user configuration data
    Column definitions:
        version(VersionT)—The schema version number
        id(PrimaryKeyT)—The primary key id of UserConfig table userName(string)—logical key
firstName(string)—users first name
lastName(string)—users last name
credential(OctetSeq)—used to authenticate
credentialType(string)—describes credential
enableMaxRetries(boolean)—enable max retries policy
maxRetries(unsigned long)—limits failed authentication
accountLocked(boolean)—when true, cannot login
comments(string)—description of user
enablePwdExpTime(boolean)—enable password expiration policy
passwdExpTime(unsigned long long)—password expiration time
emailAddr(string)—email address
offLocation(string)—office location
title(string)—the title
role(string)—organization role
netUseAttr(string)—network usage attribute
The following keys are unique:

| ( |
|---|
| userName, |
| ) |

This table is referenced by the following tables:
    Column member in table GroupMember—Disabled delete is False
2. GroupConfig—The group table
    Column definitions:
        version(VersionT)—The schema version number
        id(PrimaryKeyT)—The primary key id of GroupConfig table
        groupName(string)—logical key
        isDefault(boolean)—Indicates the default group
        virtGrp(PrimaryKeyT)—the virtual group
    The following keys are unique:

| ( |
|---|
| groupName, |
| ) |

The foreign keys and the associated tables for this table are as follows:
    virtGrp—references the VirtGroup table
This table is referenced by the following tables:
    Column group in table GroupMember—Disabled delete is True
    Column member in table GroupMember—Disabled delete is False
3. GroupMember—The User-Group relationship table
    Column definitions:
        group(PrimaryKeyT)—the group that has the member
        member(PrimaryKeyT)—the member of the group
        is User(boolean)—true when member is a UserConfig entity
    The foreign keys and the associated tables for this table are as follows:
        group—references the GroupConfig table
        member—references either the UserConfig table or GroupConfig table depending on the value of is User column
4. Authenticator—The table for authenticators
    Column definitions:
        version(VersionT)—The schema version number
        id(PrimaryKeyT)—The primary key id of Authenticator table
        name(string)—The name of the authenticator
        ipaddr(string)—The IP address of the authenticator
        netmask(string)—The network mask for the bundle
        secret(string)—The shared secret
        devType(unsigned long)—The device type
        devVendor(string)—The device vendor
        devModel(string)—The device model
        isBundle(boolean)—Set to true for authenticator bundle
        srvcat(PrimaryKeyT)—Foreign key to the service category
    The following keys are unique:

| ( |
|---|
| name, |
| ) |

The foreign keys and the associated tables for this table are as follows:
    srvcat—references the ServiceCat table
This table is referenced by the following tables:
    Column member in table AuthenGroupMember—Disabled delete is False
5. AuthenGroup—The authenticator group table
    Column definitions:
        version(VersionT)—The schema version number
        id(PrimaryKeyT)—The primary key id of AuthenGroup table
        groupName(string)—Name of the group
        isDefault(boolean)—Indicates the default AuthenGroup entry
    The following keys are unique:

| ( |
|---|
| groupName, |
| ) |

This table is referenced by the following tables:
    Column group in table AuthenGroupMember—Disabled delete is True
    Column member in table AuthenGroupMember—Disabled delete is False
    Column authenGrp in table RealmMap—Disabled delete is True
6. AuthenGroupMember—The Authenticator-Group relationship table
    Column definitions:
        group(PrimaryKeyT)—the group that has the member
        member(PrimaryKeyT)—the member of the group
        isAuthen(boolean)—true when member is a Authenticator entity
    The foreign keys and the associated tables for this table are as follows:
        group—references the AuthenGroup table
        member—references either the Authenticator table or AuthenGroup table depending on the value of isAuthen column
7. ServiceCat—The table for service categories
    Column definitions:
        version(VersionT)—The schema version number
        id(PrimaryKeyT)—The primary key id of ServiceCat table
        name(string)—The name of the service category
        irPolicy(PrimaryKeyT)—The reference to IR Policy
        tlPolicy(PrimaryKeyT)—The reference to Tunnel Policy
        cvPolicy(PrimaryKeyT)—The reference to CV Policy authoPolicy(PrimaryKeyT)—The reference to Authorization Policy
isDefault(boolean)—Indicates the default ServiceCat entry
The following keys are unique:

$$(\text{name},)$$

The foreign keys and the associated tables for this table are as follows:
  irPolicy—references the IRPolicy table
  tlPolicy—references the TunnelPolicy table
  cvPolicy—references the CVPolicy table
  authoPolicy—references the AuthoPolicy table
This table is referenced by the following tables:
  Column srvcat in table Authenticator—Disabled delete is True
8. DirSet—The table for directory sets
  Column definitions:
    version(VersionT)—The schema version number
    id(PrimaryKeyT)—The primary key id of DirSet table
    name(string)—The name of the directory service
  The following keys are unique:

$$(\text{name},)$$

This table is referenced by the following tables:
    Column dirSet in table DirSetEnt—Disabled delete is False
    Column defDirSet in table IRPolicy—Disabled delete is True
    Column dirSet in table RealmMap—Disabled delete is True
9. DirSrv—The table for directory services
  Column definitions:
    version(VersionT)—The schema version number
    id(PrimaryKeyT)—The primary key id of DirSrv table
    name(string)—The name of the directory service
    srvtype(unsigned long)—The service type
    secproto(unsigned long)—The security protocol
    priSrvAddr(string)—The IP address of the primary server
    priSrvPort(unsigned long)—The port of the primary server
    secSrvAddr(string)—The IP address of the secondary server
    secSrvPort(unsigned long)—The port of the secondary server
    adminName(string)—The administrator name
    adminPasswd(string)—The administrator password
    usrRoot(string)—The DN for the user root
    dirRoot(string)—The DN for the directory root
    realm(string)—The realm of the service
    workgroup(string)—The workgroup of the service
    stripRealm(boolean)—Whether realm is to be stripped or not
  The following keys are unique:

$$(\text{name},)$$

This table is referenced by the following tables:
  Column dirSrv in table DirSetEnt—Disabled delete is False
  Column dirSrv in table RmtAttribute—Disabled delete is False
  Column dirSrv in table RmtGroup—Disabled delete is False
  Column dirSrv in table DirCtrl—Disabled delete is False
10. DirSetEnt—The directory set-directory service relationship table
  Column definitions:
    dirSet(PrimaryKeyT)—the directory set that has the service
    dirSrv(PrimaryKeyT)—the directory service of the directory set
    order(OrderKeyT)—the order of the directory service in the directory set
    fallThruIfNA(boolean)—fall thru if service is not available
    fallThruIfNoUsr(boolean)—fall thru if user is not found
    fallThruIfBadPasswd(boolean)—fall thru if bad password
  The foreign keys and the associated tables for this table are as follows:
    dirSet—references the DirSet table
    dirSrv—references the DirSrv table
11. DirCtrl—The table for storing control information
  Column definitions:
    version(VersionT)—The schema version number
    id(PrimaryKeyT)—The primary key id of DirCtrl table
    dirSrv(PrinaryKeyT)—the directory service
    ttlGroups(unsigned long long)—the last refresh time for groups
    ttlAttrs(unsigned long long)—the last refresh time for attributes
  The foreign keys and the associated tables for this table are as follows:
    dirSrv—references the DirSrv table
12. IRPolicy—The table for identity routing policies
  Column definitions:
    version(VersionT)—The schema version number
    id(PrimaryKeyT)—The primary key id of IRPolicy table
    name(string)—name of the policy
    defDirSet(PrimaryKeyT)—The default directory set
  The following keys are unique:

$$(\text{name},)$$

The foreign keys and the associated tables for this table are as follows:
    defDirSet—references the DirSet table
  This table is referenced by the following tables:
    Column irPolicy in table RealmMap—Disabled delete is True
    Column irPolicy in table ServiceCat—Disabled delete is True
13. RealmMap—The realm to directory set relationship table
  Column definitions:
    irPolicy(PrimaryKeyT)—the IR Policy for this mapping
    dirSet(PrimaryKeyT)—the directory set for this mapping
    realm(string)—the realm for this mapping order(OrderKeyT)—the order of the realm map
authenGrp(PrimaryKeyT)—the reference to authenticator group
The foreign keys and the associated tables for this table are as follows:
  irPolicy—references the IRPolicy table
  dirSet—references the DirSet table
  authenGrp—references the AuthenGroup table
14. TunnelPolicy—The table for storing tunnel policies
  Column definitions:
    version(VersionT)—The schema version number
    id(PrimaryKeyT)—The primary key id of TunnelPolicy table
    name(string)—name of the policy
    policy(OctetSeq)—the opaque policy object
  The following keys are unique:

$$( \text{name}, )$$

This table is referenced by the following tables:
    Column tIPolicy in table ServiceCat—Disabled delete is True
    Column cert in table SSLCertMap—Disabled delete is True
15. CVPolicy—The table for storing CV policies
  Column definitions:
    version(VersionT)—The schema version number
    id(PrimaryKeyT)—The primary key id of CVPolicy table
    name(string)—name of the policy
    policy(OctetSeq)—the opaque policy object
  The following keys are unique:

$$( \text{name}, )$$

This table is referenced by the following tables:
    Column cvPolicy in table ServiceCat—Disabled delete is True
16. AuthoPolicy—The table for storing authorization policies
  Column definitions:
    version(VersionT)—The schema version number
    id(PrimaryKeyT)—The primary key id of AuthoPolicy table
    name(string)—name of the policy
    policy(OctetSeq)—the opaque policy object
  The following keys are unique:

$$( \text{name}, )$$

This table is referenced by the following tables:
    Column authoPolicy in table ServiceCat—Disabled delete is True
17. RmtAttribute—The table for storing remote attributes
  Column definitions:
    dirSrv(PrimaryKeyT)—the directory service
    dn(string)—the dn of the attribute
    type(unsigned long)—the type of the attribute
    virtAttr(PrimaryKeyT)—the virtual attribute
  The foreign keys and the associated tables for this table are as follows:
    dirSrv—references the DirSrv table
    virtAttr—references the VirtAttribute table
18. RmtGroup—The table for storing remote groups
  Column definitions:
    version(VersionT)—The schema version number
    id(PrimaryKeyT)—The primary key id of RmtGroup table
    dirSrv(PrimaryKeyT)—the directory service
    dn(string)—the dn of the group
    sid(string)—the unique id of the group
    virtGrp(PrimaryKeyT)—the virtual group
  The foreign keys and the associated tables for this table are as follows:
    dirSrv—references the DirSrv table
    virtgrp—references the VirtGroup table
  This table is referenced by the following tables:
    Column group in table RmtGroupMember—Disabled delete is False
    Column member in table RmtGroupMember—Disabled delete is False
19. RmtGroupMember—The directory service group relationship
  Column definitions:
    group(PrinaryKeyT)—the directory service group
    member(PrimaryKeyT)—the member of the group
  The foreign keys and the associated tables for this table are as follows:
    group—references the RmtGroup table
    member—references the RmtGroup table
20. VirtAttribute—The table for virtual attributes
  Column definitions:
    version(VersionT)—The schema version number
    id(PrimaryKeyT)—The primary key id of VirtAttribute table
    name(string)—the name of the attribute
    type(unsigned long)—the type of the attribute
  The following keys are unique:

$$( \text{name}, )$$

This table is referenced by the following tables:
    Column virtAttr in table RmtAttribute—Disabled delete is True
21. VirtGroup—The table for virtual groups
  Column definitions:
    version(VersionT)—The schema version number
    id(PrimaryKeyT)—The primary key id of VirtGroup table
    name(string)—the name of the attribute
  The following keys are unique:

$$( \text{name}, )$$

This table is referenced by the following tables:
    Column virtgrp in table RmtGroup—Disabled delete is True
    Column virtgrp in table GroupConfig—Disabled delete is True 22. LogEvent—The log event table
    Column definitions:
        version(VersionT)—The schema version number
        id(PrimaryKeyT)—The primary key id of LogEvent table
        ts(unsigned long long)—log event timestamp
        channel(unsigned long)—log event channel
        severity(unsigned long)—log event severity
        entry(OctetSeq)—log event entry
23. ConfigEntry—The config entry table
    Column definitions:
        version(VersionT)—The schema version number
        id(PrimaryKeyT)—The primary key id of ConfigEntry table
        name(string)—name of the config entry
        type(unsigned long)—type of the config entry
        value(OctetSeq)—value of the config entry
24. SSLKeystore—The table for storing SSL keys
    Column definitions:
        version(VersionT)—The schema version number
        id(PrimaryKeyT)—The primary key id of SSLKeystore table
        entryName(string)—Name of the keystore entry
        privateKey(string)—private key in PEM format
        certificate(string)—certificate or CSR
        createTS(unsigned long long)—timestamp at the creation of this entry
        expireTS(unsigned long long)—expiration date for this entry
        isDefaultEntry(boolean)—Flag to indicate if this is the default entry
        isAdminEntry(boolean)—Flag to indicate if this is the admin entry
        isCertEntry(boolean)—Flag to indicate if the certificate column value is a CSR or an issued cert
        isInUse(boolean)—Flag to indicate if the certificate is in use
        keyType(unsigned long)—Enum to indicate the key algorithm RSA/DSA
    The following keys are unique:

( entryName, )

This table is referenced by the following tables:
        Column cert in table SSLCertMap—Disabled delete is True
25. SSLCertMap—The Certificate—TunnelPolicy relationship table
    Column definitions:
        tunnPolicy(PrinaryKeyT)—the tunnel policy with which this cert is bound
        cert(PrimaryKeyT)—the cert bound to this tunnel policy
    The foreign keys and the associated tables for this table are as follows:
        tunnPolicy—references the TunnelPolicy table
        cert—references the SSLKeystore table
Section 2:
The CSV files for loading the various tables have the columns and types in the following sequence:
1. UserConfig
    userName(string)—logical key
    firstName(string)—users first name
    lastName(string)—users last name
    credential(string)—used to authenticate
    credentialType(string)—describes credential
    enableMaxRetries(string)—enable max retries policy
    maxRetries(number)—limits failed authentication
    accountLocked(string)—when true, cannot login
    comments(string)—description of user
    enablePwdExpTime(string)—enable password expiration policy
    passwdExpTime(number)—password expiration time
    emailAddr(string)—email address
    offLocation(string)—office location
    title(string)—the title
    role(string)—organization role
    netUseAttr(string)—network usage attribute
2. GroupConfig
    groupName(string)—logical key
    isDefault(string)—Indicates the default group
    virtgrp(string)—the virtual group
3. GroupMember
    group(string)—the group that has the member
    member(string)—the member of the group
    isUser(string)—true when member is a UserConfig entity
4. Authenticator
    name(string)—The name of the authenticator
    ipaddr(string)—The IP address of the authenticator
    netmask(string)—The network mask for the bundle
    secret(string)—The shared secret
    devType(number)—The device type
    devVendor(string)—The device vendor
    devModel(string)—The device model
    isBundle(string)—Set to true for authenticator bundle
    srvcat(string)—Foreign key to the service category
5. AuthenGroup
    groupName(string)—Name of the group
    isDefault(string)—Indicates the default AuthenGroup entry
6. AuthenGroupMember
    group(string)—the group that has the member
    member(string)—the member of the group
    isAuthen(string)—true when member is a Authenticator entity
7. ServiceCat
    name(string)—The name of the service category
    irPolicy(string)—The reference to IR Policy
    tlPolicy(string)—The reference to Tunnel Policy
    cvPolicy(string)—The reference to CV Policy
    authoPolicy(string)—The reference to Authorization Policy
    isDefault(string)—Indicates the default ServiceCat entry
8. DirSet
    name(string)—The name of the directory service
9. DirSrv
    name(string)—The name of the directory service
    srvtype(number)—The service type
    secproto(number)—The security protocol
    priSrvAddr(string)—The IP address of the primary server
    priSrvPort(number)—The port of the primary server
    secSrvAddr(string)—The IP address of the secondary server
    secSrvPort(number)—The port of the secondary server
    adminName(string)—The administrator name
    adminPasswd(string)—The administrator password
    usrRoot(string)—The DN for the user root
    dirRoot(string)—The DN for the directory root
    realm(string)—The realm of the service
    workgroup(string)—The workgroup of the service
    stripRealm(string)—Whether realm is to be stripped or not 10. DirSetEnt
   dirSet(string)—the directory set that has the service
   dirSrv(string)—the directory service of the directory set
   order(number)—the order of the directory service in the directory set
   fallThruIfNA(string)—fall thru if service is not available
   fallThruIfNoUsr(string)—fall thru if user is not found
   fallThruIfBadPasswd(string)—fall thru if bad password
11. DirCtrl
   dirSrv(string)—the directory service
   ttlGroups(number)—the last refresh time for groups
   ttlAttrs(number)—the last refresh time for attributes
12. IRPolicy
   name(string)—name of the policy
   defDirSet(string)—The default directory set
13. RealmMap
   irPolicy(string)—the IR Policy for this mapping
   dirSet(string)—the directory set for this mapping
   realm(string)—the realm for this mapping
   order(number)—the order of the realm map
   authenGrp(string)—the reference to authenticator group
14. TunnelPolicy
   name(string)—name of the policy
   policy(string)—the opaque policy object
15. CVPolicy
   name(string)—name of the policy
   policy(string)—the opaque policy object
16. AuthoPolicy
   name(string)—name of the policy
   policy(string)—the opaque policy object
17. RmtAttribute
   dirSrv(string)—the directory service
   dn(string)—the dn of the attribute
   type(number)—the type of the attribute
   virtAttr(string)—the virtual attribue
18. RmtGroup
   dirSrv(string)—the directory service
   dn(string)—the dn of the group
   sid(string)—the unique id of the group
   virtGrp(string)—the virtual group
19. RmtGroupMember
   group(number-refkey)—the directory service group
   member(number-refkey)—the member of the group
20. VirtAttribute
   name(string)—the name of the attribute
   type(number)—the type of the attribute
21. VirtGroup
   name(string)—the name of the attribute
22. LogEvent
   ts(number)—log event timestamp
   channel(number)—log event channel
   severity(number)—log event severity
   entry(string)—log event entry
23. ConfigEntry
   name(string)—name of the config entry
   type(number)—type of the config entry
   value(string)—value of the config entry
24. SSLKeystore
   entryName(string)—Name of the keystore entry
   privateKey(string)—private key in PEM format
   certificate(string)—certificate or CSR
   createTS(number)—timestamp at the creation of this entry
   expireTS(number)—expiration date for this entry
   isDefaultEntry(string)—Flag to indicate if this is the default entry
   isAdminEntry(string)—Flag to indicate if this is the admin entry
   isCertEntry(string)—Flag to indicate if the certificate column value is a CSR or an issued cert
   isInUse(string)—Flag to indicate if the certificate is in use
   keyType(number)—Enum to indicate the key algorithm RSA/DSA
25. SSLCertMap
   tunnPolicy(string)—the tunnel policy with which this cert is bound
   cert(string)—the cert bound to this tunnel policy

APPENDIX C

XACML Mappings

XACML URN Identifiers

Tables 1 through 3 shows the Universal Resource Names (URN's) for all attributes that can be used inside Authorization Policy rules.

TABLE 1

User Attributes

| | | |
|---|---|---|
| User ID | String | urn:domainname:names:1.0:subject:user-attribute:user-id |
| First Name | String | urn:domainname:names:1.0:subject:user-attribute:first-name |
| Last Name | String | urn:domainname:names:1.0:subject:user-attribute:last-name |
| Password Expires | Date Time | urn:domainname:names:1.0:subject:user-attribute:password-expiration |
| Account Locked | Boolean | urn:domainname:names:1.0:subject:user-attribute:account-locked |
| Maximum Retries | Integer | urn:domainname:names:1.0:subject:user-attribute:max-retries |
| Group Membership | MV String | urn:domainname:names:1.0:subject:user-attribute:group-member |
| Email Address | String | urn:domainname:names:1.0:subject:user-attribute:email-address |
| Office Location | String | urn:domainname:names:1.0:subject:user-attribute:office-location |
| Title | String | urn:domainname:names:1.0:subject:user-attribute:title |
| Role | String | urn:domainname:names:1.0:subject:user-attribute:role |
| Network Usage | String | urn:domainname:names:1.0:subject:user-attribute:network-usage |

TABLE 2

Transaction Attributes

| | | |
|---|---|---|
| Time | Time | urn:domainname:names:1.0:subject:transaction-attribute:time |
| Date | Date | urn:domainname:names:1.0:subject:transaction-attribute:date |
| Date and Time | Date Time | urn:domainname:names:1.0:subject:transaction-attribute:dateTime |
| User Name (outer) | String | urn:domainname:names:1.0:subject:transaction-attribute:user-id |
| Realm (outer) | String | urn:domainname:names:1.0:subject:transaction-attribute:realm |

TABLE 2-continued

Transaction Attributes

| | | |
|---|---|---|
| Outer Tunnel Type | Enumeration | urn:domainname:names:1.0:subject:transaction-attribute:tunnel-type |
| Realm (inner) | String | urn:domainname:names:1.0:subject:transaction-attribute:realm |
| User Name (inner) | String | urn:domainname:names:1.0:subject:transaction-attribute:user-id |
| Inner Tunnel Type | Enumeration | urn:domainname:names:1.0:subject:transaction-attribute:tunnel-type |
| Supplicant MAC | String | urn:domainname:names:1.0:subject:transaction-attribute:supplicant-mac |
| Secure Tunnel | Boolean | urn:domainname:names:1.0:subject:transaction-attribute:secure-tunnel |
| Directory Service Name | String | urn:domainname:names:1.0:subject:transaction-attribute:name |
| Directory Service Type | Enumeration | urn:domainname:names:1.0:subject:transaction-attribute:directory type |
| Authentication Result | Enumeration | urn:domainname:names:1.0:subject:transaction-attribute:authentication-result |

TABLE 3

Authenticator Attributes

| | | |
|---|---|---|
| Name | String | urn:domainname:names:1.0:subject:authenticator-attribute:name |
| Bundle Name | String | urn:domainname:names:1.0:subject:authenticator-attribute:bundle-name |
| MAC Address | String | urn:domainname:names:1.0:subject:authenticator-attribute:mac-address |
| IP Address | String | urn:domainname:names:1.0:subject:authenticator-attribute:ip-address |
| Port | Integer | urn:domainname:names:1.0:subject:authenticator-attribute:port |
| Device Type | Enumeration | urn:domainname:names:1.0:subject:authenticator-attribute:device-type |
| Device Vendor | Enumeration | urn:domainname:names:1.0:subject:authenticator-attribute:device-vendor |
| Device Model | Enumeration | urn:domainname:names:1.0:subject:authenticator-attribute:device-model |
| Service Category Name | String | urn:domainname:names:1.0:subject:authenticator-attribute:service-category |
| Hierarchy Node | MV String | urn:domainname:names:1.0:subject:authenticator-attribute:group-member |

XACML Data Type Mappings

Table 4 shows the mapping between attribute data types used in the architecture 10 and the corresponding data types from the XACML specification.

TABLE 4

Data Type Mappings

| | |
|---|---|
| String | http://www.w3.org/2001/XMLSchema#string |
| Multi-Valued String | http://www.w3.org/2001/XMLSchema#string (bag of strings) |
| Integer | http://www.w3.org/2001/XMLSchema#integer |
| Boolean | http://www.w3.org/2001/XMLSchema#boolean |
| Enumeration | http://www.w3.org/2001/XMLSchema#integer |
| Date | http://www.w3.org/2001/XMLSchema#date |
| Time | http://www.w3.org/2001/XMLSchema#time |
| Date and Time | http://www.w3.org/2001/XMLSchema#dateTime |
| Group | Maps to a Multi-Valued String |

XACML Function Mappings for Each Attribute Data Type

String Data Type Function

| Operator | XACML Function |
|---|---|
| ifEqual To | urn:oasis:names:tc:xacml:1.0:function:string-equal |
| Not Equal To | urn:oasis:names:tc:xacml:1.0:function:not urn:oasis:names:tc:xacml:1.0:function:string-equal |
| Starts With | urn:domainname:names:1.0:function:string-start-with |
| Contains | urn:domainname:names:1.0:function:string-contains |
| Ends With | urn:domainname:names:1.0:function:string-ends-with |

Multi-Valued String Data Type Function

| Operator | XACML Function |
|---|---|
| Member of | urn:oasis:names:tc:1.0:function:string-bag urn:oasis:names:tc:1.0:function:string-equal |
| Not Member of | urn:oasis:names:tc:1.0:function:string-bag urn:oasis:names:tc:1.0:function:not urn:oasis:names:tc:1.0:function:string-equal |

Integer Data Type Function

| Operator | XACML Function |
|---|---|
| Equal to | urn:oasis:names:tc:1.0:function:integer-equal |
| Not Equal to | urn:oasis:names:tc:1.0:function:not urn:oasis:names:tc:1.0:function:integer-equal |
| Less Than | urn:oasis:names:tc:1.0:function:integer-less-than |
| Less Than or Equal | urn:oasis:names:tc:1.0:function:integer-less-than-or-equal |
| Greater Than | urn:oasis:names:tc:1.0:function:integer-greater-than |
| Greater Than or Equal | urn:oasis:names:tc:1.0:function:integer-greater-than-or-equal |

Boolean Data Type Function

| Operator | XACML Function |
|---|---|
| Is True | urn:oasis:names:tc:1.0:function:oolean-equal (With True) |
| Is False | urn:oasis:names:tc:1.0:function:oolean-equal (With False) |
| AND | urn:oasis:names:tc:1.0:function:and |
| OR | urn:oasis:names:tc:1.0:function:or |
| NOT | urn:oasis:names:tc:1.0:function:not |

| Enumeration Data Type Function | |
| --- | --- |
| Operator | XACML Function |
| Equal to | urn:oasis:names:tc:xacml:1.0:function:integer-equal |
| Not Equal to | urn:oasis:names:tc:xacml:1.0:function:not |
| | urn:oasis:names:tc:xacml:1.0:function:integer-equal |

| Data Data Type Functions | |
| --- | --- |
| Operator | XACML Function |
| Equal to | urn:oasis:names:tc:xacml:1.0:function:date-equal |
| Not Equal to | urn:oasis:names:tc:xacml:1.0:function:not |
| | urn:oasis:names:tc:xacml:1.0:function:date-equal |
| Less Than | urn:oasis:names:tc:xacml:1.0:function:date-less-than |
| Less Than or Equal | urn:oasis:names:tc:xacml:1.0:function:date-less-than-or-equal |
| Greater Than | urn:oasis:names:tc:xacml:1.0:function:date-greater-than |
| Greater Than or Equal | urn:oasis:names:tc:xacml:1.0:function:date-greater-than-or-equal |
| Between | urn:domainname:names:1.0:function:date-is-between |
| Week Day Is between | urn:domainname:names:1.0:function:date-week-day-is-between |

| Time Data Type Functions | |
| --- | --- |
| Operator | XACML Function |
| Equal to | urn:oasis:names:tc:xacml:1.0:function:time-equal |
| Not Equal to | urn:oasis:names:tc:xacml:1.0:function:not |
| | urn:oasis:names:tc:xacml:1.0:function:time-equal |
| Less Than | urn:oasis:names:tc:xacml:1.0:function:time-less-than |
| Less Than or Equal | urn:oasis:names:tc:xacml:1.0:function:time-less-than-or-equal |
| Greater Than or Equal | urn:oasis:names:tc:xacml:1.0:function:time-greater-than-for-equal |
| Between | urn:domainname:names:1.0:function:time-is-between |

| DataTime Data Type Functions | |
| --- | --- |
| Operator | XACML Function |
| Equal To | urn:oasis:names:tc:xacml:1.0:function:dateTime-equal |
| Not Equal To | urn:oasis:names:tc:xacml:1.0:function:not |
| | urn:oasis:names:tc:xacml:1.0:function:dateTime-equal |
| Less Than | urn:oasis:names:tc:xacml:1.0:function:dateTime-less-than |
| Less Than or Equal | urn:oasis:names:tc:xacml:1.0:function:dateTime-than-or-equal |
| Greater Than | urn:oasis:names:tc:xacml:1.0:function:dateTime-greater-than |
| Greater Than or Equal | urn:oasis:names:tc:xacml:1.0:function:dateTime-greater-than-or-equal |
| Between | urn:domainname:namesl:1.0:function:dateTime-is-between |

| Provisioning Policy Mappings | |
| --- | --- |
| Policy | XACML Function |
| VLAN Assignment | http://www/w3/org/2001/XMLSchema#string |
| User Timeout | http://www/w3/org/2001/XMLSchema#integer |

What is claimed as the invention is:

1. An authentication and authorization method to determine access rights of a user on a network in response to receipt of an authentication protocol request message sent by an authenticator comprising the steps of:
   determining, based on said authentication protocol request message, a type of network access of said user of a plurality of types of network access;
   locating for said authenticator an access service category associated with said authentication protocol request message based on said type of network access, said access service category being one of a plurality of access service categories, each access service category being associated with a respective type of network access of said plurality of types of network access, each said access service category having each of a respective credential validation policy and a respective authorization policy associated therewith, each said authorization policy having at least one respective rule and further having a respective provisioning policy associated therewith, said at least one respective rule identifying at least one attribute value and a corresponding comparison operator;
   validating credentials for said user contained in said authentication protocol request message in accordance with said credential validation policy, said user being authenticated in the event said credentials are validated;
   determining that said user is authorized on said network in accordance with said at least one respective rule of said respective authorization policy based on a comparison of said at least one attribute value to an attribute value associated with one of said user and said authenticator in accordance with said corresponding comparison operator;
   locating said provisioning policy associated with said authorization policy and determining at least one provisioning setting associated with said provisioning policy in response to said user being authorized; and
   sending an access allowed message to said authenticator upon completion of said locating step indicating that said user is allowed a connection to said network and including said at least one provisioning setting to be associated with said connection.

2. An authentication and authorization method as set forth in claim 1 wherein said authentication and authorization method further comprises the step of determining, prior to locating for said authenticator said access service category associated with said authentication protocol request message based on said type of network access, whether said request message has been received from said authenticator for an existing session, and in the event said session is determined to be existing, subsequently locating for said authenticator said access service category associated with said authentication protocol request message based on said type of network access.

3. An authentication and authorization method as set forth in claim 2 wherein said access service category further has an outer tunnel policy associated therewith, said outer tunnel policy having at least one outer tunnel type, and further wherein said authentication and authorization method further comprises the steps of:

determining whether said outer tunnel type is established in accordance with said outer tunnel policy; and locating, in the event said outer tunnel type is established, user data associated with said authenticator prior to determining that said user is authorized on said network in accordance with said at least one respective rule of said respective authorization policy.

4. An authentication and authorization method as set forth in claim 3 wherein said authentication and authorization method further comprises steps of:

locating, in the event said outer tunnel type is not established, said outer tunnel policy to determine said outer tunnel type; and negotiating said outer tunnel type in the event said outer tunnel type is located so that said outer tunnel type is established prior to said validating step.

5. An authentication and authorization method as set forth in claim 3 wherein said access service category further has a user location policy associated therewith, said user location policy having at least one rule that is capable of being evaluated as one of true and false based on at least one attribute value associated with said authentication protocol request message, said at least one rule of said user location policy having a directory set containing at least one user record associated therewith, and further wherein said user data locating step includes the steps of:

determining whether a username and a realm obtainable from said authentication protocol request message is contained in said user record;

locating said user location policy in the event said username and said realm are contained in said user record;

evaluating said rule of said user location policy;

locating, in the event said rule of said user location policy evaluates as true, said directory set associated with said rule of said user location policy such that said user record for said authenticator may be validated in accordance with said validating step.

6. An authentication and authorization method as set forth in claim 5 wherein said directory set includes a plurality of user records, said directory set locating step further includes the steps of:

searching each of said user records in said directory set for one of said user records identifiable by said username and said realm in said authentication protocol request message;

applying a selected one of user mapping and group mapping for said one of said user records; and validating said one of said user records, said validated one of said user records being used by said validating step.

7. An authentication and authorization method as set forth in claim 3 wherein said access service category further has an inner tunnel policy associated therewith and wherein said authentication and authorization method further includes the steps of determining whether an inner tunnel type is established in accordance with said inner tunnel policy subsequent to said user data locating step.

8. An authentication and authorization method as set forth in claim 7 wherein said authentication and authorization method further comprises the steps of:

locating, in the event said inner tunnel type is not established, said inner tunnel policy to determine said inner tunnel type; and negotiating said inner tunnel type in the event said inner tunnel type is located so that said inner tunnel type becomes established prior to said validating step.

9. An authentication and authorization method as set forth in claim 2 wherein said authentication and authorization method further comprises the steps of:

initiating, in the event said session is determined not to be existing, a new session prior to said access service category locating step;

locating, subsequently to said access service category locating step, an outer tunnel policy, said outer tunnel policy having at least one outer tunnel type;

negotiating said outer tunnel type so that said outer tunnel type becomes established; and locating, subsequent to said outer tunnel type being established, user data associated with said user.

10. An authentication and authorization method as set forth in claim 9 wherein said access service category further has a user location policy associated therewith, said user location policy having at least one rule that is capable of being evaluated as being one of true and false based on at least one attribute value associated with said authentication protocol request message, said at least one rule of said user location policy having a directory set containing at least one user record associated therewith, and further wherein said user data locating step includes the steps of:

determining whether a username and a realm obtainable from said authentication protocol request message is contained in said user record;

locating said user location policy in the event said username and said realm are contained in said user record;

evaluating said rule of said user location policy;

locating, in the event said rule of said user location policy evaluates as true, said directory set associated with said rule of said user location policy such that said user record for said user may be validated in accordance with said validating step.

11. An authentication and authorization method as set forth in claim 10 wherein said directory set includes a plurality of user records, said directory set locating step further includes the steps of:

searching each of said user records in said directory set for one of said user records identifiable by said authentication protocol request message;

applying a selected one of user mapping and group mapping for said one of said user records; and validating said one of said user records said validated one of said user records being used by said validating step.

12. An authentication and authorization method as set forth in claim 9 wherein said access service category further has an inner tunnel policy associated therewith and wherein said authentication and authorization method further includes the steps of determining whether an inner tunnel type is established in accordance with said inner tunnel policy subsequent to said user data locating step.

13. An authentication and authorization method as set forth in claim 12 wherein said authentication and authorization method further comprises the steps of:

locating, in the event said inner tunnel type is not established, said inner tunnel policy to determine said inner tunnel type; and negotiating said inner tunnel type in the event said inner tunnel type is located so that said inner tunnel type becomes established prior to said validating step.

14. The method of claim 1, wherein the authorization policy further comprises a policy action having an attribute value selected from a group of reject, allow, and allow with provisioning.

15. The method of claim 14, further comprising:
determining that the policy action of the authorization policy has an attribute value of allow with provisioning; and wherein locating said provisioning policy associated with said authorization policy and determining at least one provisioning setting associated with said provisioning policy further comprises locating said provisioning policy from a plurality of provisioning policies based on the at least one respective rule.

16. An authentication and authorization apparatus to determine access rights of a user on a network in response to receipt of an authentication protocol request message sent by an authenticator, said apparatus comprising:
a network interface configured to communicate with a network; and
processing device coupled to said network interface and configured to:
determine, based on said authentication protocol request message, a type of network access of said user of a plurality of types of network access:
locate for said authenticator an access service category associated with said authentication protocol request message based on said type of network access, said access service category being one of a plurality of access service categories, each access service category being associated with a respective type of network access of said plurality of types of network access;
based on a respective credential validation policy object associated with said access service category object, each particular access service category of said plurality of access service categories having a respective credential validation policy object of a plurality of credential validation policy objects associated therewith, authenticate said user based on credentials contained in said authentication protocol request message in accordance with said respective credential validation policy object; and
based on a particular authorization policy object associated with said access service category object, an authorization policy object of a plurality of authorization policy objects being associated with each particular access service category, said particular authorization policy object having at least one rule, and further having a particular provisioning policy object associated therewith, said at least one rule identifying at least one attribute value and a corresponding comparison operator, determine that said user is authorized on said network in accordance with said at least one rule of said respective authorization policy object based on a comparison of said at least one attribute value to an attribute value associated with one of said user and said authenticator in accordance with said corresponding comparison operator;
determine at least one provisioning setting associated with said particular provisioning policy object in response to said user being authorized on said network; and
send an access allowed message to said authenticator indicating that said user is allowed a connection and including said at least one provisioning setting to be associated with said connection.

17. An authentication and authorization apparatus as set forth in claim 16 wherein said access service category object is located in response to receipt of said authentication protocol request message for an existing session.

18. An authentication and authorization apparatus as set forth in claim 17 further comprising an outer tunnel policy object associated with said access service category object, said outer tunnel policy object having at least one outer tunnel type, wherein user data associated with said user is obtained in the event said outer tunnel type is established.

19. An authentication and authorization apparatus as set forth in claim 18 further comprising a user location policy object associated with said access service category object, said user location policy object having at least one rule that is capable of being evaluated as being one of true and false based on at least one attribute value associated with said authentication protocol request message, said at least one rule of said user location policy object having a directory set containing at least one user record associated therewith, said authentication protocol request message containing a username and a realm, said user location policy object being located in the event said username and said realm are contained in said user record, said rule of said user location policy being evaluated in response to said user location policy object being located, said directory set associated with said rule of said user location policy object being located in the event said rule of said user location policy evaluates as true such that said user record for said user may be validated.

20. A non-transitory computer readable medium containing executable code, which when implemented executes procedures to determine access rights of a user on a network in response to receipt of an authentication protocol request message sent by an authenticator, said code comprising procedures of:
determining, based on said authentication protocol request message, a type of network access of said user of a plurality of types of network access;
locating for said authenticator an access service category associated with said authentication protocol request message based on said type of network access, said access service category being one of a plurality of access service categories, each access service category being associated with a respective type of network access of said plurality of types of network access, each said access service category having each of a credential validation policy and an authorization policy associated therewith, each said authorization policy having at least one respective rule and further having a respective provisioning policy associated therewith, said at least one respective rule identifying at least one attribute value and a corresponding comparison operator;
validating credentials for said user contained in said authentication protocol request message in accordance with said credential validation policy, said user being authenticated in the event said credentials are validated;
determining that said user is authorized on said network in accordance with said at least one respective rule of said respective authorization policy based on a comparison of said at least one attribute value to an attribute value associated with one of said user and said authenticator in accordance with said corresponding comparison operator;
locating said provisioning policy associated with said authorization policy and determining at least one provisioning setting associated with said provisioning policy in response to said user being authorized; and
sending an access allowed message to said authenticator upon completion of said locating step indicating that said user is allowed a connection to said network and including said at least one provisioning setting to be associated with said connection.

21. A non-transitory computer readable medium as set forth in claim 20 wherein said code method further comprises the procedure of determining, prior to said locating procedure, whether said request message has been received from said authenticator for an existing session, and in the event said session is determined to be existing, subsequently performing said access service category locating procedure.

22. A non-transitory computer readable medium as set forth in claim 21 wherein said access service category further has an outer tunnel policy associated therewith, said outer tunnel policy having at least one outer tunnel type, and further wherein said code further comprises the procedures of:
- determining whether said outer tunnel type is established in accordance with said outer tunnel policy; and
- locating, in the event said outer tunnel type is established, user data associated with said user prior to said evaluating procedure.

\* \* \* \* \*